United States Patent [19]

Iuchi et al.

[11] Patent Number: 5,017,018
[45] Date of Patent: May 21, 1991

[54] CLINICAL THERMOMETER

[75] Inventors: Tohru Iuchi; Yukio Nakamori; Atsushi Kawasaki; HIrokatsu Yashiro; Yoh-ichi Nagatake, all of Kawasaki, Japan

[73] Assignee: Nippon Steel Corporation, Tokyo, Japan

[21] Appl. No.: 397,466

[22] PCT Filed: Dec. 23, 1988

[86] PCT No.: PCT/JP88/01294
§ 371 Date: Aug. 18, 1989
§ 102(e) Date: Aug. 18, 1989

[87] PCT Pub. No.: WO89/06348
PCT Pub. Date: Jul. 13, 1989

[30] Foreign Application Priority Data

Dec. 25, 1987 [JP] Japan .................................. 62-328613
Dec. 25, 1987 [JP] Japan .................................. 62-328614

[51] Int. Cl.⁵ .......................... A61B 5/00; G01J 5/00; G01K 1/08
[52] U.S. Cl. ..................... 374/130; 128/736; 250/346; 250/353; 350/1.4; 374/124; 374/165
[58] Field of Search ............... 374/124, 133, 165, 130; 128/736; 250/353, 363.5, 346

[56] References Cited

U.S. PATENT DOCUMENTS

| 3,273,395 | 9/1966 | Schwarz | 374/133 |
| 3,444,739 | 5/1969 | Treharne | 374/133 X |
| 3,448,283 | 6/1969 | Higley et al. | 374/133 X |
| 3,492,058 | 1/1970 | Waldman | 350/1.4 |
| 3,507,153 | 4/1970 | Jones et al. | 374/165 X |
| 3,530,718 | 9/1970 | Ehlo | 374/165 |
| 4,301,682 | 11/1981 | Everest | 374/133 X |
| 4,634,294 | 1/1987 | Christol et al. | 374/124 X |
| 4,636,091 | 1/1987 | Pompei et al. | 374/124 |
| 4,895,164 | 1/1990 | Wood | 374/124 X |

Primary Examiner—Daniel M. Yasich
Attorney, Agent, or Firm—Spencer & Frank

[57] ABSTRACT

A clinical thermometer which employs an infrared sensor and is constructed so as to prevent the occurrence of a temperature measurement error caused by a change in temperature of a tip portion (of a housing a temperature measuring portion) during temperature measurement. In one embodiment a heat insulator is attached to the tip portion to prevent a rise in temperature of the tip portion. In a second embodiment, the tip portion is formed of a metal of good heat conductivity in the shape of a net for example to improve the heat radiating property of the tip portion, thereby preventing a rise in temperature of the tip portion. In a third embodiments, a temperature sensor is attached to the tip portion to correct a temperature measurement error caused by a change in temperature of the tip portion.

14 Claims, 17 Drawing Sheets

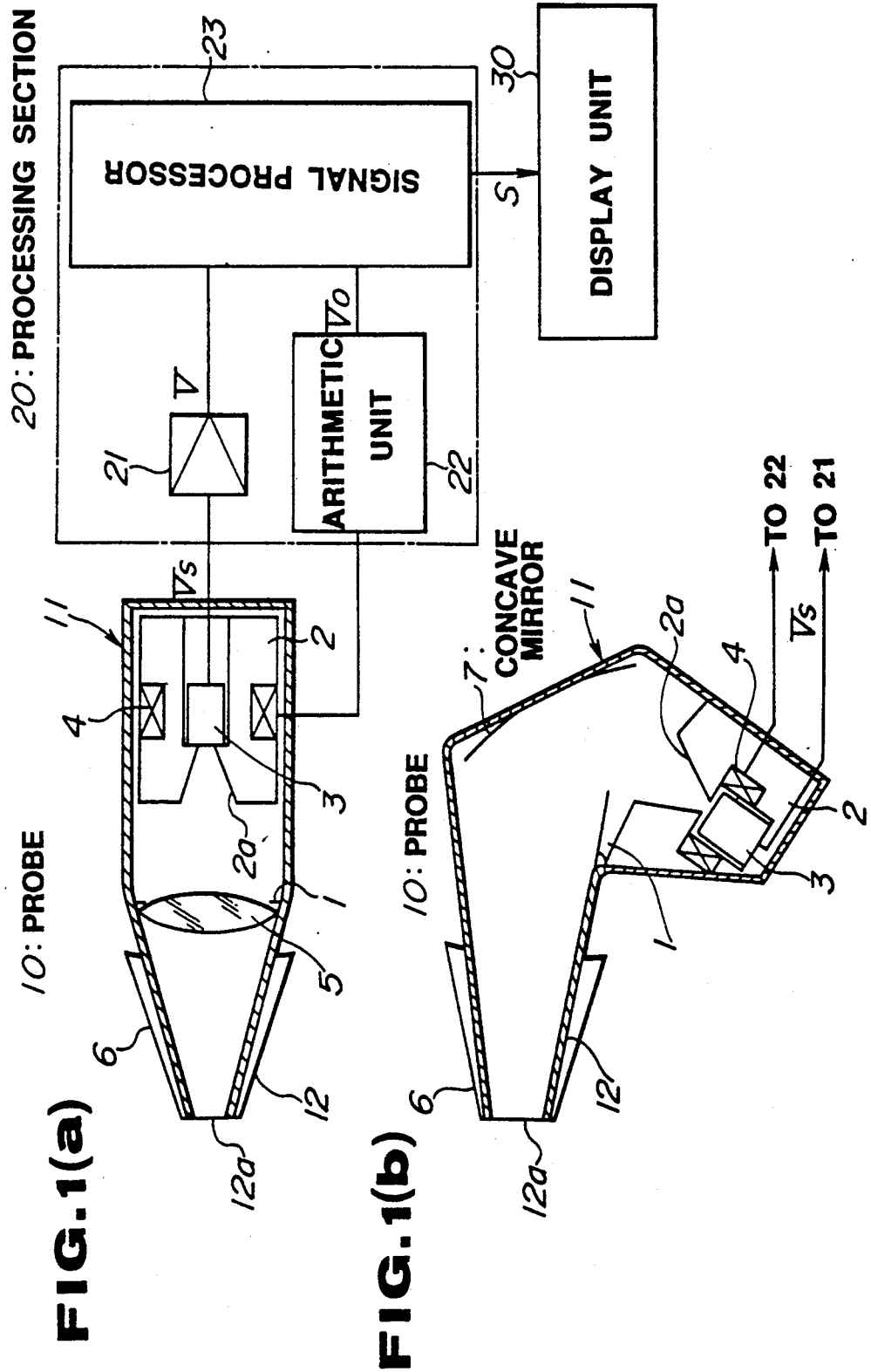

FIG. 4(a)
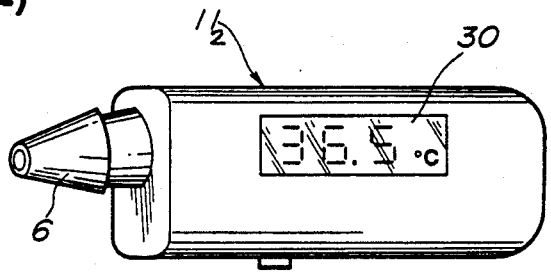
FIG. 4(b)
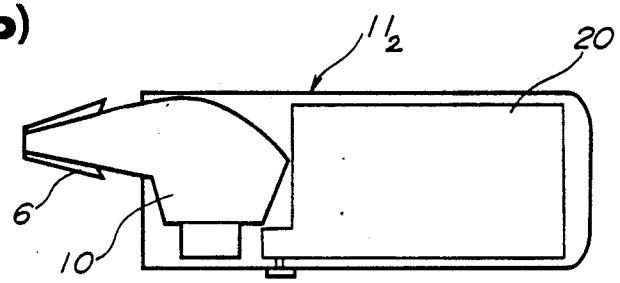
FIG. 5(a)   FIG. 5(b)
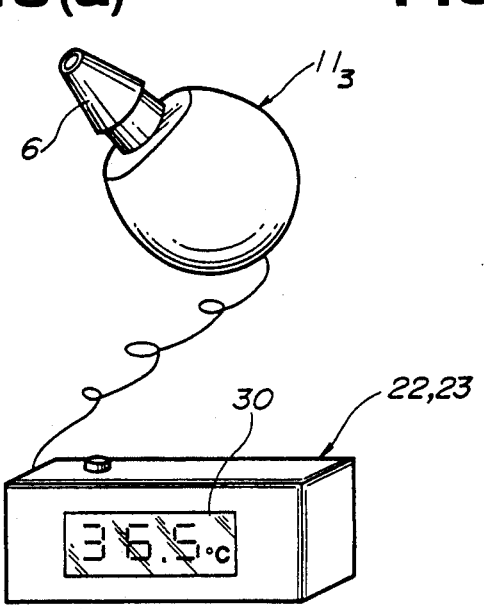
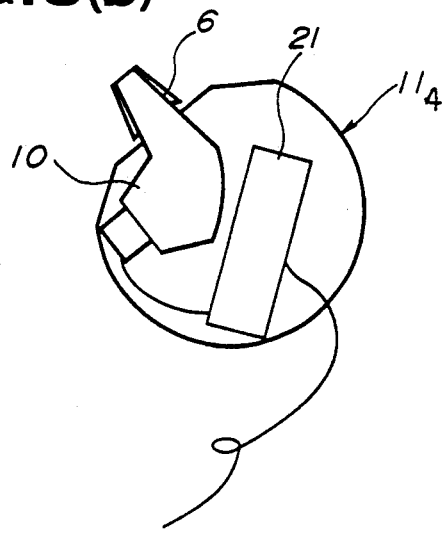

FIG.23
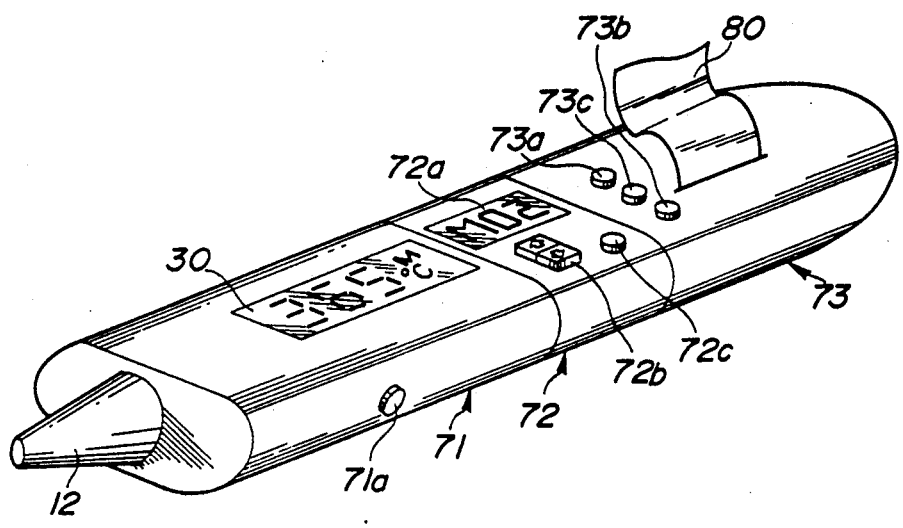
FIG.24(a)
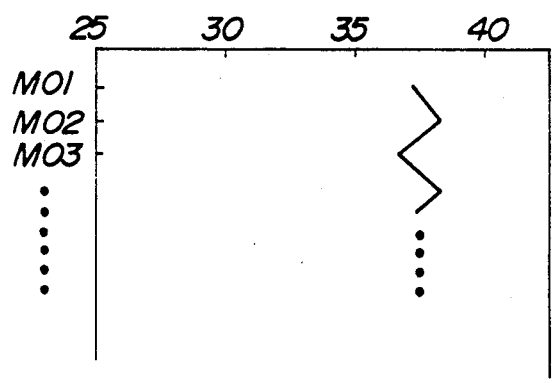
FIG.24(b)
| M01 | 1988-11-18 | 13:13 | 36.5°C |
| M02 | 1988-11-18 | 20:10 | 37.0°C |
| M03 | 1988-11-19 | 8:31 | 36.0°C |

FIG.27(a)
FIG.27(b)
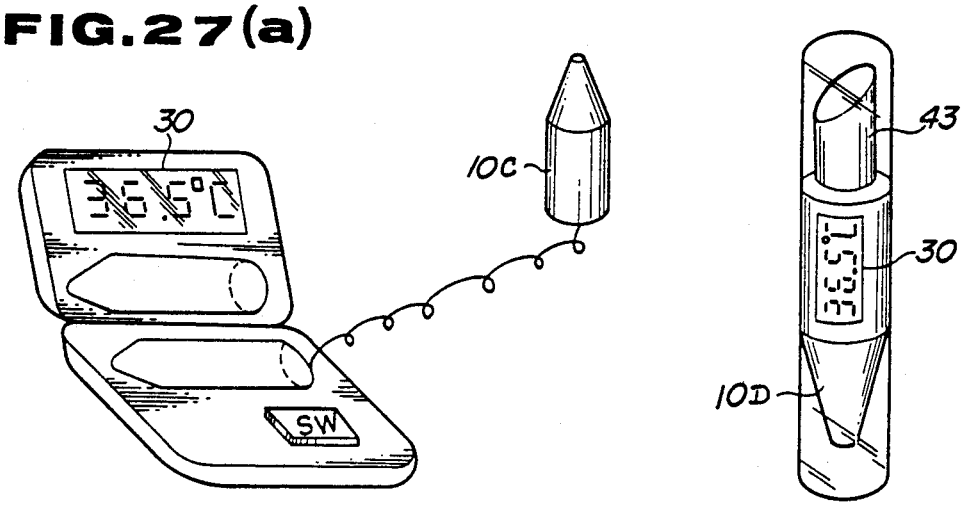
FIG.27(c)
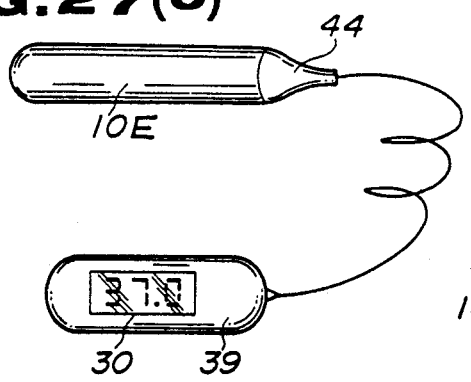
FIG.27(d)
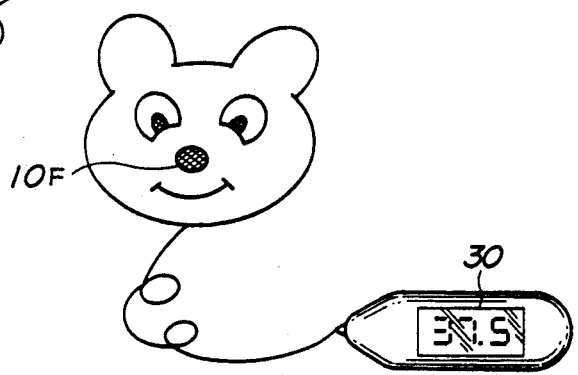
FIG.27(e)
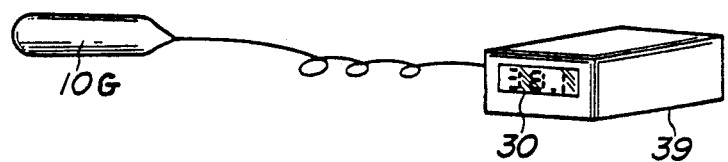

CLINICAL THERMOMETER

FIELD OF ART

The present invention relates to an infrared clinical thermometer using an infrared sensor and particularly to the correction of a temperature measurement error for the same.

BACKGROUND ART

Heretofore, as a clinical thermometer there has widely been used a mercury thermometer, but recently a digital electronic clinical thermometer has also come into wide use.

Ordinary electronic clinical thermometers use a thermistor as a sensor and are provided with an arithmetic circuit for the calculation of temperature values and a digital display unit. But it takes two to three minutes for the measurement of temperature, which time is even longer than that required in mercury clinical thermometer. There is an electronic clinical thermometer of the type in which the final value is estimated from the progress of temperature rise during an initial one minute or so. But this type of an electronic clinical thermometer involves the problem that the so-estimated value is not always coincident with an actual value.

The problem of requiring time for the measurement of temperature is also related to the portion where the temperature is to be measured. It is the temperatures of such deep parts as head, chest and abdominal cavity that are maintained at predetermined values by the adjusting function of a living body. But it is difficult to directly measure the temperatures of those deep parts, so in general the temperature to be measured is rectal temperature, oral temperature, or axilla temperature. The axilla temperature measurement is widely adopted, but the axilla is usually in a somewhat open condition, so the skin temperature of that part is a little lower. When the axilla is closed with a clinical thermometer put therein, the skin temperature will begin rising and reach a certain temperature (equilibrium temperature) in 10 minutes or so. If at this point or thereafter the clinical thermometer is pulled out and checked, there will be obtained an accurate axilla temperature. But if the clinical thermometer is pulled out earlier, the temperature value shown thereon will be a little lower.

Another factor related to the temperature measurement time is the heat capacity of the sensor portion. In a mercury clinical thermometer, the temperature measurement goes through the process of warming the mercury bulb by the body temperature through the glass wall and reading the expansion of mercury, so the heat capacity of the object warmed is fairly large, requiring a measurement time of 2 to 3 minutes. Also in an electronic clinical thermometer, a metallic portion contacted with a part for measurement is warmed by the body temperature and the thermistor varies its resistance value depending on the temperature of the metallic portion, so the heat capacity of the object warmed (the metallic portion) is also large.

All of the above clinical thermometers are of a contact type, but there also are available non-contact type clinical thermometers, an example of which is the "non-contact type oral thermometer" disclosed in Japanese Patent Laid-Open No. 88627/83. In this oral thermometer, using a pyroelectric type infrared sensor, infrared rays from the oral cavity are condensed and input to the sensor after chopping, while the output of the sensor is amplified and calculation is made on the basis of a reference temperature signal to determine the body temperature, which is displayed on a display unit. Alternatively, using a thermistor as an infrared sensor, the oral thermometer is composed of a condensing system, the thermistor, an amplifier, an arithmetic unit, a display mechanism and a reference temperature detector.

As a method of measuring the body temperature by inserting a clinical thermometer into the ear cavity there have been proposed such methods as those disclosed in Japanese Patent Laid-Open Nos. 25427/85, 216232/85, 133331/85, 117422/86, 138130/86, and U.S. Pat. No. 3,282,106 (1966). However, these proposed methods have not been realized yet because of the following problems involved therein.

The Japanese patent laid-open 25427/85 is merely entitled "an ear-plug type body temperature sensor". It is uncertain whether the body temperature is measured by a contact heat transfer of a resistance bulb such as a thermistor or by using such a sensor as an Si sensor for detecting infrared rays (radiation). Thus, since it is uncertain what measuring means is used, it is actually impossible to constitute a clinical thermometer.

The patent laid-open 216232/85 discloses an ear-plug type thermometer which measures the body temperature by a contact heat transfer with the external auditory meatus, using a thermistor as a temperature sensor. However, since this method is a contact type, it can be easily estimated that a longer temperature measuring time is required than in an oral type electronic clinical thermometer.

The patent laid-open 133331/85 discloses an ear sealing type thermometer, which however is basically the same as the ear-plug type thermometer of the patent laid-open 216232/85 because it uses a thermistor and a transistor sensor as temperature sensors.

The patent laid-open 117422/86 discloses an ear insertion type thermometer using a thermopile as an infrared sensor. According to the method set forth therein, the sensor portion is maintained at a certain constant temperature and the body temperature is measured by a reference method, using a reference temperature source provided in the device. This method is technically superior, but a complicated construction is needed for maintaining the temperature of the sensor portion constant and for the provision of a reference temperature source, thus obstructing a low-cost production.

The patent laid-open 138130/86 discloses a method wherein infrared rays from the ear cavity are conducted to a pyroelectric sensor through an optical fiber. But an infrared optical fiber for the measurement of body temperature has not been developed yet. The wavelength band of the energy radiated from the body temperature is in the range of 8 to 13 $\mu$m and there has not been developed a fiber capable of fully transmitting radiation of such wavelength band. At ordinary temperatures or thereabouts, such radiation from the fiber itself is not negligible, so from the standpoint of accuracy it is difficult to realize a clinical thermometer using an optical fiber. Even if such clinical thermometer were realized, it would be very expensive.

The U.S. Pat. No. 3,282,106 (1966) entitled "Method of Measuring Body Temperature" is concerned with a method of measuring the body temperature by detecting in a non-contact manner infrared radiation of 10 $\mu$m in wave length emitted from a body cavity of a mammal typical of which cavity is the ear cavity. But this method is disadvantageous in that there occurs a temperature error because the change in temperature of the sensor portion is not considered.

Thus, the contact type clinical thermometers involve the problem that the time required for temperature measurement is long, and the conventional non-contact type clinical thermometers which are sensitive to infrared rays involve the problem of construction being complicated and the cost high.

OBJECTS OF THE INVENTION

It is an object of the present invention to remedy the above-mentioned drawbacks and provide an infrared clinical thermometer capable of measuring the body temperature in a shorter time, simple in construction, capable of being fabricated inexpensively and superior in measurement accuracy. According to the present invention the body temperature is measured by inserting the clinical thermometer into a cavity such as the ear cavity or the oral cavity, but in this case, there is the problem that the temperature of the tip portion of a housing inserted into the cavity is raised by the body temperature, causing a measurement error. It is therefore another object of the present invention to prevent the occurrence of a temperature measurement error by making such rise of temperature negligible.

SUMMARY OF THE INVENTION

According to a first embodiment of the invention for achieving the above-mentioned objects, there is provided a clinical thermometer including an infrared sensor (3) disposed within a housing (11), an optical system (5) for condensing (directly or converging) infrared rays (radiation) to the infrared sensor which infrared radiation is incident from a tip portion of the housing as inserted into a body cavity, a temperature measuring element (4) for measuring the ambient temperature of the infrared sensor, a heat insulator (6) mounted on the said tip portion, a processing section (20) for outputting a body temperature signal after correction for the ambient temperature of the infrared sensor, and a display unit (30) which receives the body temperature signal and displays the body temperature visually.

According to a second embodiment of the invention for achieving the above-mentioned objects, there is provided a clinical thermometer including an infrared sensor (3) disposed within a housing (11), an optical system (5) for condensing infrared radiation to the infrared sensor which infrared radiation is incident from a tip portion of the housing as inserted into a body cavity, a temperature measuring element (4) for measuring the ambient temperature of the infrared sensor, a processing section (20) for outputting a body temperature signal after correction for the ambient temperature of the infrared sensor, and a display unit (30) which receives the body temperature signal and displays the body temperature visually, said tip portion being formed by a linear member or a rod-like member.

Further, according to a third embodiment of the invention for achieving the above-mentioned objects, there is provided a clinical thermometer including an infrared sensor (3) disposed within a housing (11), an optical system (5) for directing infrared radiation to the infrared sensor which infrared radiation is incident from a tip portion of the housing as inserted into a body cavity, a first temperature measuring element (4a) for measuring the ambient temperature of the infrared sensor, a second temperature measuring element (4b) for measuring the temperature of the said tip portion, a processing portion (20) which receives the outputs of the infrared sensor and the first and second temperature measuring elements and outputs a body temperature signal after correction for the ambient temperature of the infrared sensor and for the temperature of the housing tip portion, and a display portion (30) which receives the said body temperature signal and displays the body temperature visually.

According to the clinical thermometers of the constructions of the above first, second and third embodiments, even if in the temperature measurement the temperature of the housing tip portion as a temperature measuring part changes in contact with the ear or oral cavity of human body as a part to be measured to temperature, it is possible to measure the body temperature accurately, with few errors in the measurement, and to do so quickly and easily.

BRIEF DESCRIPTION OF THE DRAWINGS

FIGS. 1(a) and 1(b) are views respectively showing a basic construction of a clinical thermometer and a modification thereof according to a first embodiment of the invention;

FIGS. 4(a) and 4(b) comprise respectively a schematic perspective view and a schematic sectional view, of an integral mirror type clinical thermometer;

FIGS. 5(a) and 5(b) are respectively a schematic view, and a schematic sectional view of a separative mirror type clinical thermometer;

FIG. 23 is a schematic perspective view of an application example of the third embodiment of the invention;

FIGS. 24(a) and 24(b) are views respectively showing a plotting example and a print example;

FIGS. 27(a)-27(e) are schematic perspective views of other application examples of the third embodiment of the invention.

BEST MODE FOR PRACTISING THE INVENTION

Figure 2A:
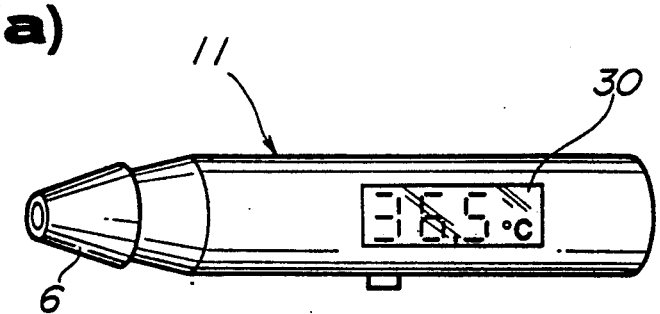
FIGS. 2(a) and 2(b) comprise respectively a schematic perspective view and a schematic sectional view, of an integral lens type clinical thermometer.
Figure 2B:
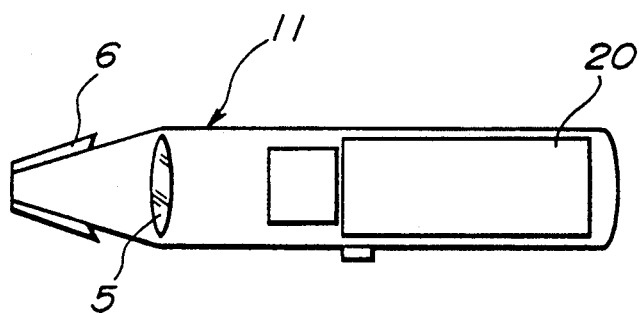

A embodiment of the first invention will now be described with reference to FIGS 1a to 10. FIGS. 1(a) and 1(b) illustrate a basic construction of a clinical thermometer according to a first embodiment of the invention. This clinical thermometer broadly comprises a probe 10, a processing section 20 and a display section 30.

The probe 10 has a housing 11, within which are mounted an infrared sensor, e.g. a thermopile 3, a support 2 for the sensor, and an optical system lens 5 in FIG. 1(a), mirror 7 in FIG. 1(b). The housing 11 is formed with a tip portion 12 to inserted into a cavity such as the ear or oral cavity, the tip portion 12 having size and shape conforming to such cavity, with a heat insulator 6 being mounted on the tip portion. A temperature measuring element 4 is disposed in the support 2 to measure the ambient temperature of the infrared sensor 3 and hence the temperature of the same sensor. The temperature measuring element 4 is constituted by a resistance bulb such as thermistor, or a temperature measuring IC such as a diode or transistor.

The tip portion 12 has an open tip end 12a. Infrared rays radiated from the foregoing cavity passes through the opening 12a and enters the housing, in which it is condensed (converged) by the lens 5 for infrared radiation or mirror 7 and enters the infrared sensor 3. In this incident path is placed a diaphragm 1, and the portion of the support 2 corresponding to the incident path forms an aperture. A circumferential surface 2a of the aperture is conical. Together with the diaphragm 1, the conical circumferential surface 2a determines a solid angle of the infrared radiation incident on the infrared sensor 3. The circumferential surface 2a is darkened for infrared radiation (wave length: 5~20μn). When the infrared radiation radiated from the interior of the housing 11 reaches the circumferential surface 2a, this surface absorbs the infrared radiation to prevent the latter from entering the infrared sensor 3. The inner surface of the housing 11 is processed to a mirror surface by plating or vapor deposition of Al, Au, or Cr to reduce the emissivity in the infrared wavelength region.

The processing section 20 includes a signal amplifier 21 for amplifying the output, Vs, of the infrared sensor 3, an arithmetic unit 22 for converting the output (change in resistance) of the temperature measuring element (thermistor) 4, and a signal processor 23 which receives the output, V, of the amplifier 21 and the output, Vo, of the arithmetic unit 22 and outputs a body temperature signal S. The amplifier 21, arithmetic unit 22 and signal processor 23 may be constituted each individually or integrally.

Figure 3:
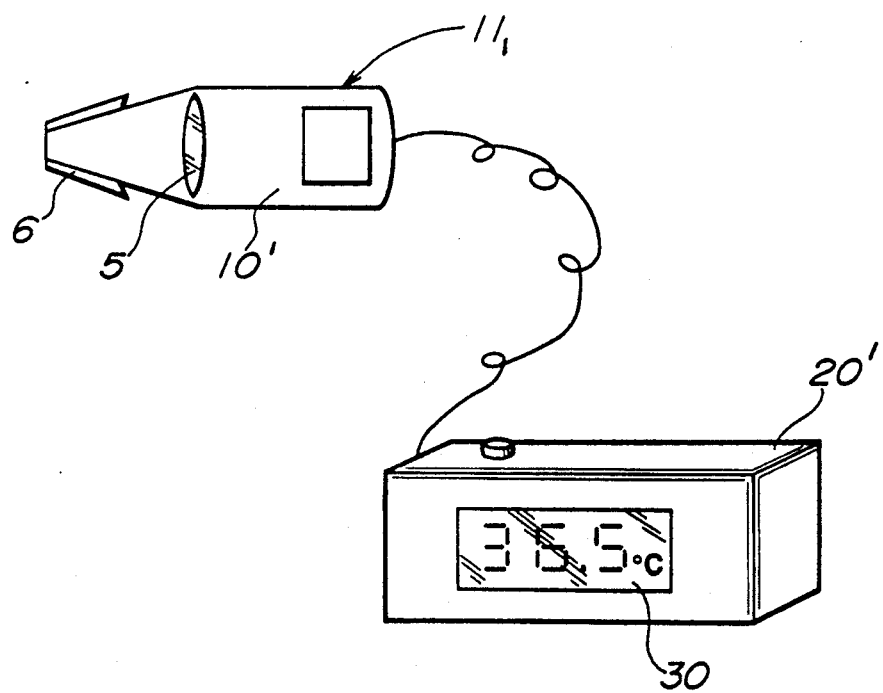
FIG. 3 is a schematic perspective view of a separative lens type clinical thermometer.

The processing section 20 and the display section 30 may be constituted integrally with or separately from the probe 10, as shown in FIGS. 2(a) to 5(b). FIGS. 2(a) and 2(b) are a schematic perspective view and a schematic sectional view, respectively, of a lens type clinical thermometer, in which a probe, a processing portion and a display portion are formed integrally. FIG. 3 is also a schematic perspective view of a lens type clinical thermometer, in which, however, a probe 10' in a housing 11₁ is separated from a processing section 20' and a display section 30. FIGS. 4(a) and 4(b) are a schematic perspective view and a schematic sectional view, respectively, of a mirror type clinical thermometer, in which a probe, a processing section and a display section are formed integrally in a housing 11₂. FIG. 5(a) is also a schematic perspective view of a mirror type clinical thermometer, in which, however, a probe in a housing 11₃ is separated from a processing section and a display section. In the separate construction, the probe 10 may be disposed within the housing 11₄ as shown in FIG. 5(b).

According to the above construction, in measuring the body temperature, the tip portion 12 of the probe 10 is inserted, for example, into the ear cavity, and infrared radiation radiated from the ear cavity in accordance with the temperature of the cavity passes through the tip end opening 12a and enters the interior of the housing 11. The incident infrared radiation is converged by the lens 5 or mirror 7 and radiated to the infrared sensor 3. Therefore, the output Vs of the infrared sensor 3 corresponds to the incident infrared radiation, that is, the internal temperature of the ear cavity, and hence the body temperature.

Figure 6:
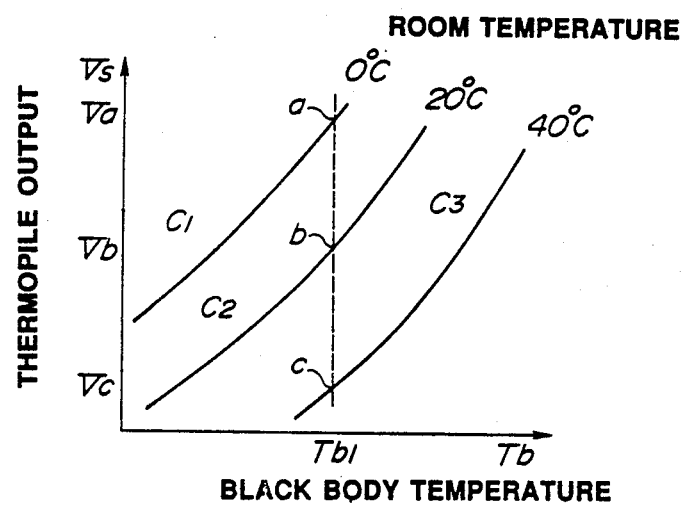
FIG. 6 is a graph showing black body temperature vs. thermopile output.

However, as shown in FIG. 6, the output Vs of the infrared sensor 3 also varies depending on the ambient temperature. The axis of ordinate and that of abscissa in FIG. 6 represent the output Vs and the black body (ear cavity temperature and hence the body temperature) Tb, respectively, and the curves $C_1$, $C_2$, $C_3$ in the same figure are Vs-Tb curves at room temperatures (ambient temperatures) of 0°, 20° and 40° C., respectively. As is apparent from this graph, in order to check the body temperature it is necessary to know room temperature, i.e., ambient temperature of the infrared sensor, in addition to the output Vs of the infrared sensor. The arithmetic unit 22 provides this room temperature.

When the housing tip portion 12 is inserted into the ear cavity, its temperature rises and so the dose of the infrared radiation radiated from the tip portion 12 changes (increases), causing an error. Such a phenomenon occurs in the temperature measurement using infrared radiation, but this scarcely causes any problem in the case where the temperature of the object to be measured is high. However, where the temperature of the object to be measured is low such as the body temperature, the above phenomenon causes a small error (e.g. an error of 0.1° C. at a temperature rise of 2° C.). The heat insulator 6 covers the housing tip portion 12 to insulate the latter from heat, thereby preventing the tip portion from rising in temperature during the measurement of temperature.

Using the output voltage V of the amplifier 21 and the output voltage Vo of the amplifier 22, the signal processor 23 outputs a correct body temperature signal S after correction of the ambient temperature of the infrared sensor and causes the display unit 30 to display the body temperature. When the display unit is an analog type, the signal S is an analog signal, while when it is a digital type, the signal S is a digital signal.

The temperature correction for the output of the infrared sensor 3 will now be explained. The electromotive force generated, Vs, of the infrared sensor (thermopile) 3 is proportional to $\alpha$ ($T^4 - To^4$) wherein $\alpha$, T and To represent a coefficient, the temperature of the object measured, and the room temperature, respectively, (T and To both being absolute temperatures). Where the range of measurement is narrow, the error is very small even if calculation is made according to a linear approximation. In other words, the electromotive force generated, Vs, may be assumed to be proportional to $\beta$ (T−To) ($\beta$: constant determined by the temperature measurement range, or a coefficient dependent on components, lens, mirror, shape and solid angle).

If the temperature measuring element 4 is a resistance bulb such as a platinum resistance bulb, the change in resistance caused by the change of temperature can be represented as $R = \bar{R}(1+\gamma t)$ wherein $\bar{R}$, $\gamma$ and t represent a resistance value at 0° C., a temperature coefficient and a measured temperature, respectively. In the case of a platinum resistance bulb, JIS applies. A temperature sensing element which exhibits negative characteristics such as a thermistor is also employable.

Since the amplified voltage V of the output Vs of the thermopile 3 is an output proportional to the difference between the internal temperature T of the ear cavity and room temperature To, [V=$\beta$ (T−To)], the difference in temperature, $\Delta T$ (=T−To), is determined by V/$\beta$. Since the room temperature To is determined from the output Vo of the temperature measuring element 4, the temperature T of the object measured is calculated from To+V/$\beta$.

Figure 7A:
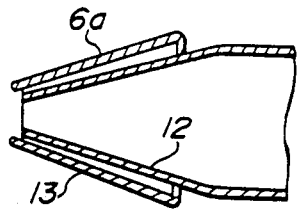
FIGS. 7(a), 7(b), 7(c), 8(a) and 8(b) are views each showing the structure of a heat insulator.

FIGS. 7(a), 7(b), 7(c), 8(a) and 8(b) are views each showing the structure of the heat insulator 6. In FIG. 7(a), the heat insulator 6 is in the form of a thin-walled cap 6a having lugs at the tip or rear end thereof. The heat insulator 6 is in contact with the outer peripheral surface of the housing tip portion 12 through the lugs 60 to form an air gap 13 between the inner surface of the cap and the outer peripheral surface of the housing tip portion. The air gap 13 effects heat insulation. When the tip portion of the probe 10 is inserted into the ear or oral cavity, the temperature of the tip portion 12 rises due to the body temperature and the dose of infrared radiation radiated from the inner surface of the tip portion increases. If the infrared radiation should enter the infrared sensor 3, there would occur an error in the temperature measurement, but the presence of the air gap 13 prevents the rise in temperature of the housing tip portion 12, whereby the occurrence of error mentioned above is prevented.

Figure 7C:
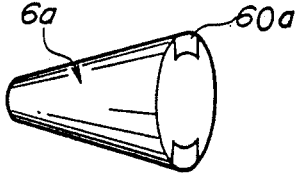

The lugs 60 are preferably small in area to reduce the heat transfer therethrough. To this end, in FIG. 7(b), three lugs 60 of a narrow width are disposed at intervals of 120°, while in FIG. 7(c), two lugs 60a are provided at an interval of 180°. The lugs shown in FIG. 7(c) are larger in width than the lugs in FIG. 7(b) from the standpoint of safety.

The cap 6a is required to have rigidity to some extent so may be formed of a metal or a rigid plastic, but not limited thereto.

Figure 8A:
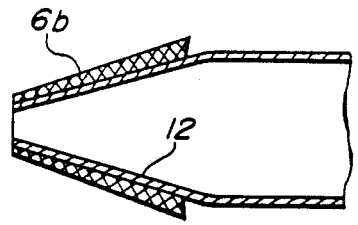
Figure 7B:
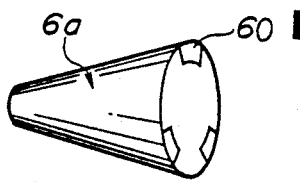
Figure 8B:
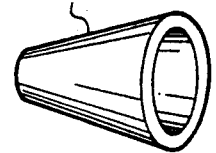

In FIG. 8(a), the heat insulator is in the form of a cap 6b formed of a thick-walled heat insulating material. Since it is fitted on the housing tip portion 12, its inner peripheral surface is of the same shape as the outer peripheral surface of the tip portion. FIG. 8(b) is a perspective view of the cap 6b. The cap 6b may be formed of such a material as polyurethane, polystyrene foam, glass wool, paper, or cotton.

The opening 12a of the housing tip portion 12 may be covered with a thin plate such as, for example, a silicon, germanium or polyethylene plate. In this case, such thin plate may be attached to the cap. The cap may be fixed to the housing tip portion 12, or it may be rendered removable.

It is also effective to form the inner surface of the housing tip portion 12 (the inner surface from the tip end 12a up to the lens 5 or mirror 7) as a mirror surface if possible. More particularly, since the mirror surface is small in emissivity, even if the temperature of the housing tip portion 12 rises during the temperature measurement, the change in dose of the infrared radiation radiated from the inner surface of the said tip portion will be small and hence the measurement error small. Therefore, it is extremely effective to subject the inner surface of the tip portion to vapor deposition of gold or aluminum or plating of gold or aluminum.

Figure 9A:
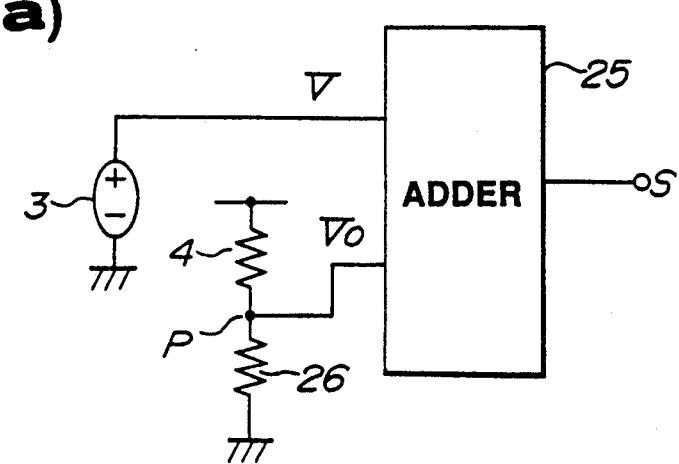
FIGS. 9(a) and 9(b) are circuit diagrams of examples of the construction of a processing section.
Figure 9B:
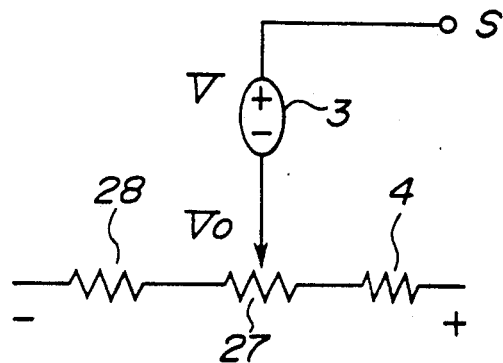

FIGS. 9(a) and 9(b) show examples of construction of the processing section 20. In FIG. 9(a), the numeral 25 denotes an adder (subtracter), which receives the output of an infrared sensor (a thermopile 3 in this example) and that of a temperature measuring element (a thermistor 4 in this example) and outputs a body temperature signal S on the basis of the sum of both outputs. Since V =$\beta$ (T−To), Vo $\propto$ To, the body temperature V is determined by multiplying V by 1/$\beta$ and then adding the signal To from the temperature measuring element. Numeral 26 denotes a resistor, which is connected across a power source in series with the thermistor 4, with an output voltage Vo developed at a junction P. For example, as shown in FIG. 6, if the thermopile outputs at points a, b and c are Va, Vb and Vc, respectively, the thermopile output at a black body temperature of Tb₁ and at room temperature of 20° C. is Vb, lower by Va−Vb than the output Va at a room temperature of 0° C. If this Va−Vb is generated by the thermistor 4, the black body temperature Tb can be determined from the thermopile output in a corrected state at 0° C.

In FIG. 9(b), a thermistor 4, a variable resistor 27 and a fixed resistor 28 are connected in series across a power source and one end of the thermopile 3 is connected to a slider of the variable resistor 27, from the other end of which is taken out a temperature signal S. Also in this construction, the above calculations are performed. The variable resistor 27 is for adjusting the temperature characteristic of the output Vo.

Figure 10:
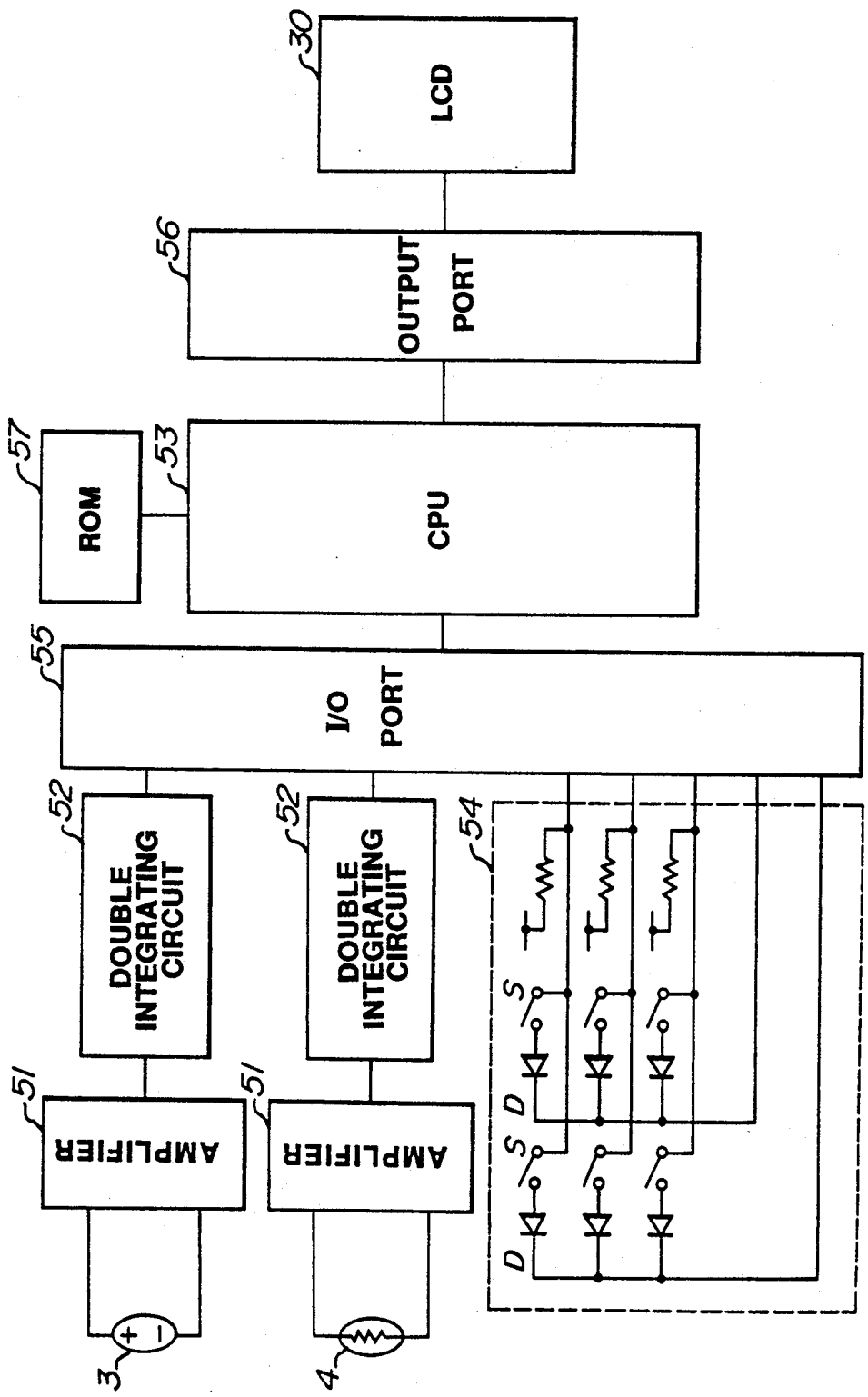
FIG. 10 is a view showing another example of construction of a processing section.

Another constructional example of the processing section 20 is shown in FIG. 10. In FIG. 10, numerals 51 and 52 denote an amplifier and a double integrating circuit, respectively, numeral 53 denotes a CPU for performing arithmetic processings, and numeral 54 denotes a coefficient setting section. Further, numerals 55, 56 and 57 denote an input port, an output port, and a ROM with a program stored therein. The signals from the thermopile 3 and the temperature measuring element (room sensor) 4 are converted to sufficiently large signals by means of amplifiers 51 each having an appropriate amplification factor, which signals are then fed to double integrating circuits 52 (a kind of A/D converter), respectively. The double integrating circuits 51 provide pulses to the CPU 53 which pulses each have a time width proportional to the input signal. The CPU 53 measures those pulses for time width using an internal counter. The count values corresponding to the signals from the thermopile 3 and the temperature measuring element 4 respectively are multiplied by coefficients which have been set by the coefficient setting section 54, to correct a solid difference in the sensor characteristics. A final temperature value calculated by applying an arithmetic processing to the count values after correction by the CPU 53 is fed as a display value to the display section 30. The coefficient setting section 54 is composed of arrayed diodes D and switches S and is connected to the input/output port 55 of the CPU 53, whereby it can digitally set coefficient values not changing with time, thereby permitting correction of the sensor characteristics. As a result, it becomes unnecessary to use RAM and so it is possible to reduce the power consumption. In place of the mechanical contacts of the switches S shown in FIG. 10 there may be used thin film conductors, whereby the coefficient setting section 54 can be reduced in size and cost as compared with the mechanical switches.

According to the above first embodiment it is possible to make room temperature correction for the thermopile 3, and the rise in temperature of the tip portion 12 in the measurement of temperature can be prevented by the heat insulator 6 fitted on the tip portion 12, so it is possible to diminish the occurrence of measurement error.

FIGS. 11(a)–(e) are schematic sectional views showing sensor portions each comprising a thermopile, a temperature measuring element and a support, of a photoclinical thermometer according to modifications of the first embodiment of the invention. In FIGS. 11(a) to 11(e), numeral 14 denotes a sensor portion; numerals 3x and 3y represent lead wires of the thermopile 3; and numerals 4x and 4y represent lead wires of the temperature measuring element 4. Since the modifications are directed only to the sensor portion 14, there will be omitted a perspective view and a block diagram of the overall structure. Also, for the modifications illustrated in FIGS. 11(a) to 11(e) as well as the modifications and further embodiments inventions which will be described later, the components having the same functions as in the above embodiment shown in FIGS. 1(a) to 10 will be designated by the same reference numerals and detailed explanations thereof will be omitted.

Figure 11A:
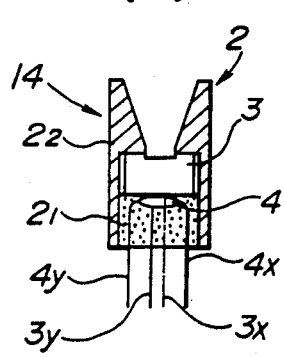
FIGS. 11(a)–11(e) are schematic sectional of views a sensor portion according to exemplary modifications of the first embodiment of the invention.
Figure 11B:
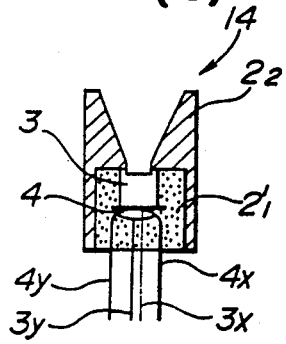
Figure 11C:
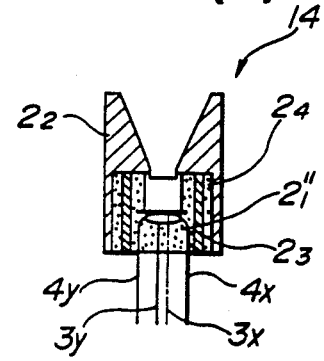
Figure 11D:
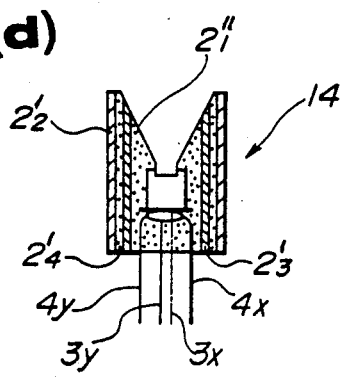
Figure 11E:
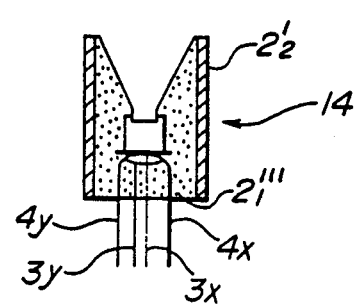

The modified sensor portions of FIGS. 11(a)–11(e) are different from the first embodiment in that a temperature measuring element 4 as a room temperature sensor is bonded to the bottom of a thermopile 3 and both are embedded in a support which includes a high thermal conductivity member. The sensor portion shown in FIG. 11(a) is formed by bonding the temperature measuring element 4 (e.g. a resistor) to the bottom of the thermopile 3, embedding the temperature measuring element 4 in a copper block $2_1$ having a thickness of about 5 mm and enclosing them with a plastic material $2_2$ superior in heat insulating property. In the sensor portion shown in FIG. 11(b), there is used a thermopile 3 a little smaller than that shown in FIG. 11(a) and both thermopile 3 and temperature measuring element 4 are embedded in a copper block $2_1$. In the sensor portion shown in FIG. 11(c), in order to further reduce the influence of the heat transfer from the exterior of the sensor portion, both thermopile 3 and temperature measuring element 4 are embedded in the copper block $2_1$, and a heat insulating material $2_3$ (e.g. polyurethane, ceramic, or glass fiber) is disposed outside the copper block $2_1$. Further, a copper pipe $2_4$ is disposed outside the heat insulating material $2_3$ and all are enclosed with the plastic material $2_2$. The sensor portion shown in FIG. 11(d) wherein copper block $2_1''$, plastic insulating material $2'_2$, heat insulating material $2'_3$ and copper pipe $2'_4$ are provided, is a modification of FIG. 11(c) and that shown in FIG. 11(e) wherein only copper block $2_1'''$ and a plastic insulating material $2_2'$ are provided, is a modification of FIG. 11(b). The lead wires 3x, 3y, 4x and 4y are drawn out to the exterior of the sensor portion 14 through holes (not shown) formed in the copper block. They are coated to prevent short-circuit therebetween. The copper block may be replaced with any other metal block if only the metal is superior in heat conductivity, e.g. aluminum.

Figure 12:
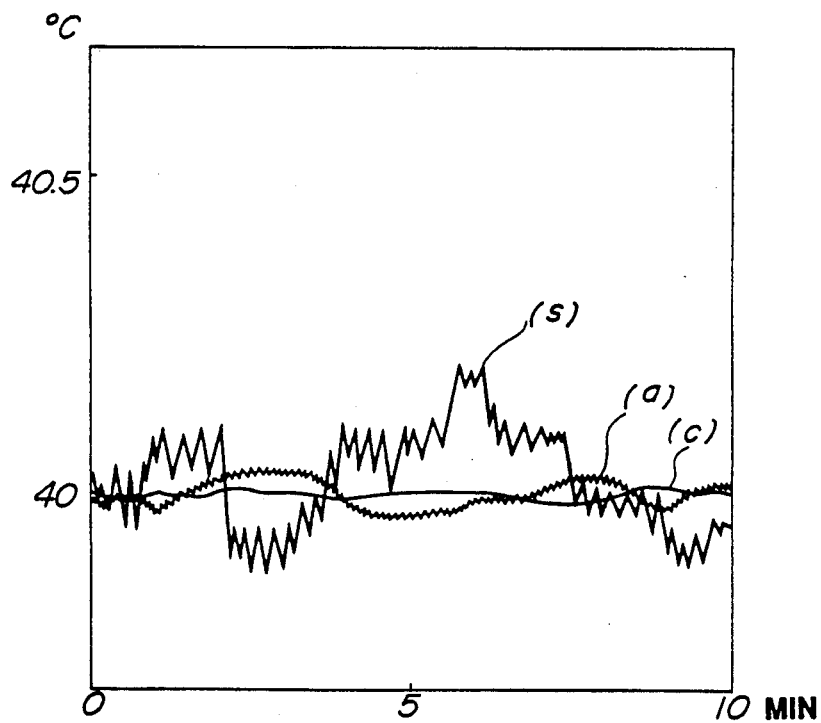
FIG. 12 is a graph of experimental data thereof.

FIG. 12 is a graphical representation of experimental data showing temperature readings obtained when the clinical thermometer of this embodiment was operated continuously for 10 minutes in a position facing a black body furnace held at 40° C. The mark (s) represents readings obtained without using the copper block; the mark (a) represents readings obtained using the sensor portion shown in FIG. 11(a); and the mark (c) represents readings obtained using the sensor portion shown in FIG. 11(c). As shown in FIG. 12, with the thermopile 3 alone (without using the copper block), there occurs thermal imbalance between the thermopile 3 and the temperature measuring element 4 under the influence of temperature fluctuation of the environment, so that there occurs a fluctuation of about ±0.2° C. in the output. On the other hand, in the use of the sensor portion 14 with the copper block $2_1$ shown in FIG. 11(a), there are obtained stable readings. The stability is further improved in the use of the sensor portion 14 shown in FIG. 11(c). Also in the use of the sensor portions 14 shown in FIGS. 11(b), (d) and (e), there were obtained the same effects though not shown. Thus, according to this embodiment, a copper or any other metal block superior in heat conductivity is disposed around the thermopile 3 to increase the heat capacity and cut off the transfer of heat from the exterior, whereby it is possible to improve the stability of measurement. Other functions and effects are the same as in the foregoing first embodiment.

Figure 13A:
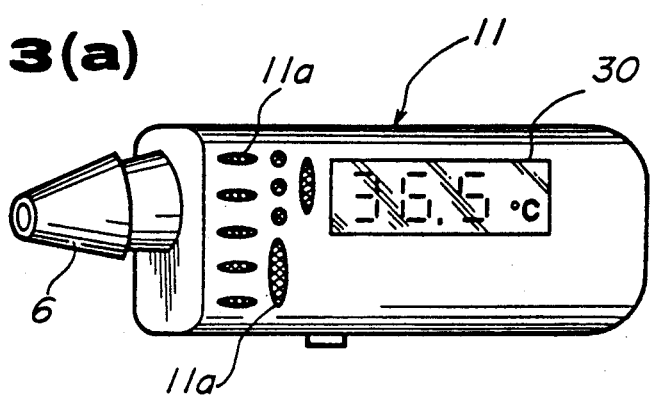
FIGS. 13(a), 13(b) and 13(c) are schematic views showing further modifications of the first embodiment of the invention.
Figure 13B:
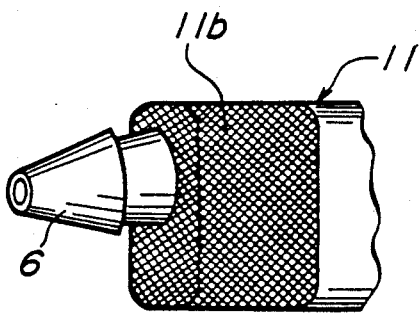
Figure 13C:
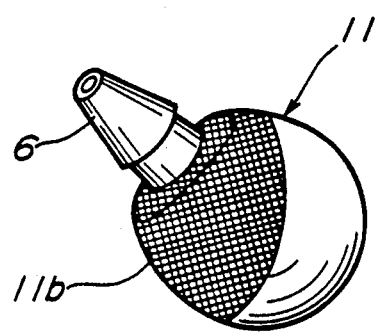

FIGS. 13(a) and 13(b) illustrates a clinical thermometer according to a further modifications of the first embodiment of the invention, in which FIG. 13(a) is a schematic perspective view thereof and FIGS. 13(b) and 13(c) are schematic perspective views of housings each disposed around a sensor portion. In FIGS. 13(a) to 13(c), numeral 11a denotes a cooling vent hole formed in a housing 11 and numeral 11b denotes a metal net which affords good ventilation.

These modifications define a difference from the foregoing embodiment in that the housing 11 is provided with a ventilating portion around the sensor portion 14 to improve the ventilation of the sensor portion 14. In FIG. 13(a), a plurality of vent holes formed of a plastic material are formed in the housing 11 around the sensor portion 14, while in FIG. 13(b), the portion of the housing 11 around the sensor portion 14 is formed with a metal net, such as, for example, a mesh the type used in an electric shaver, in place of the vent holes 11a. In the ventilating portion shown in FIG. 13(c), the portion of a probe housing 11 around a sensor portion in a probe separation type clinical thermometer is formed with a metal net similar to that shown in FIG. 13(b).

Figure 14:
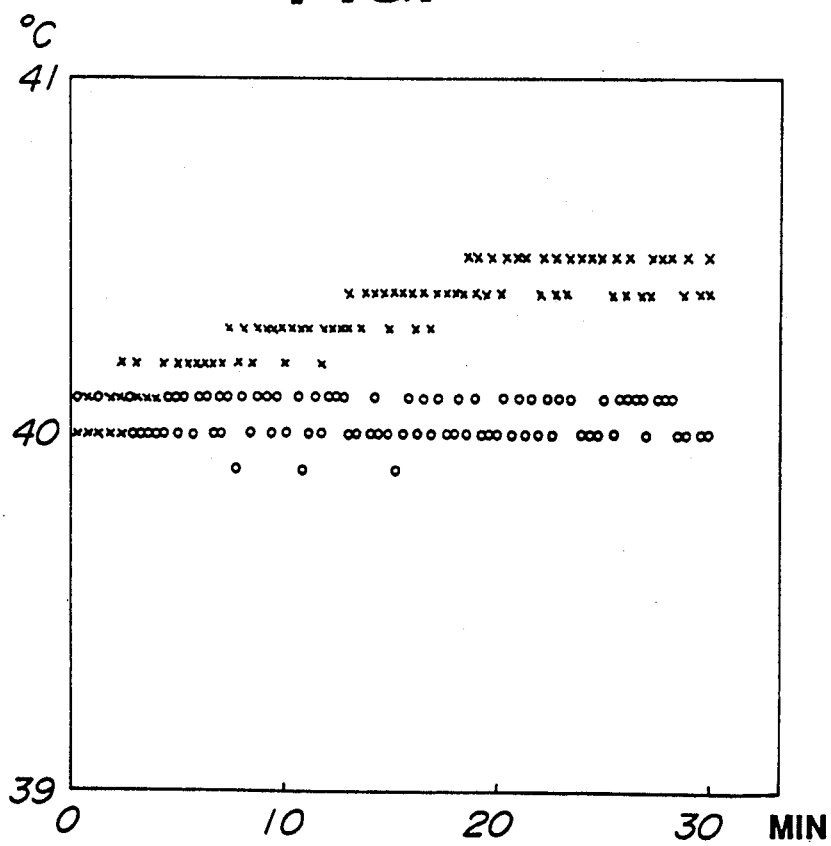
FIG. 14 is a plot of experimental data thereof.

FIG. 14 is a plot of experimental data showing temperature readings obtained when the clinical thermometer of this embodiment was operated continuously for 30 minutes in a position facing a black body furnace held at 40° C. while the outer periphery of the housing was heated at 45° C. by a vinyl heater. In FIG. 14, the x-mark represents data obtained in the absence of a ventilating portion, while the o-mark represents data obtained in the presence of a ventilating portion. As shown in FIG. 14, when the clinical thermometer is not provided with a ventilating portion, there occurs thermal imbalance around the sensor with the lapse of time, thus causing a measurement error, but there is observed little influence in the clinical thermometer provided with the vent holes 11a shown in FIG. 13(a). The same effect was obtained also in the clinical thermometer of the structure shown in FIG. 13(b). Thus, according to this embodiment, by having the portion of the housing 11 around the sensor well ventilated, it is possible to prevent the transfer of heat from the hand which grips the case of the clinical thermometer at the time of measurement and also possible to remove thermal imbalance around the sensor due to a cooling effect. As a result, it is possible to provide a stable clinical thermometer free of measurement error. Other functions and effects are the same as in the foregoing first embodiment.

As described in detail above, according to the first invention there can be provided a highly accurate, relatively inexpensive, clinical thermometer capable of measuring the body temperature quickly and easily, which thermometer has been subjected to room temperature correction for the infrared sensor and prevented from causing a measurement error based on the rise of temperature upon insertion of the housing tip into the ear or oral cavity.

Figure 15A:
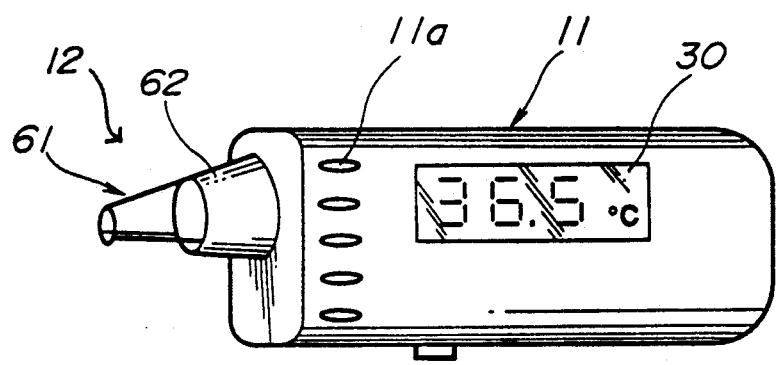
FIGS. 15(a) and 15(b) are, respectively a schematic perspective view and a schematic sectional view, of a clinical thermometer (mirror type) according to a second embodiment of the invention.
Figure 15B:
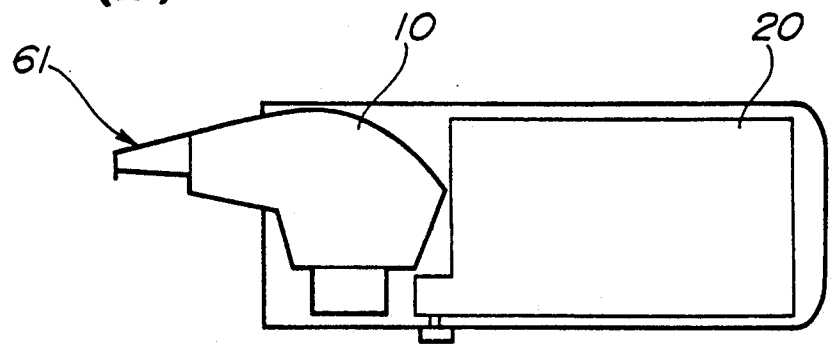
Figure 16A:
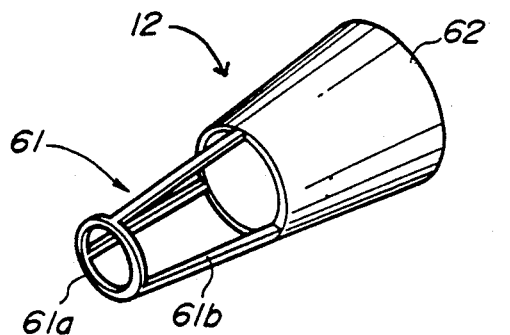
FIGS. 16(a), 16(b) and 16(c) is a schematic perspective views of exemplary tip portions of a probe used therein.
Figure 16B:
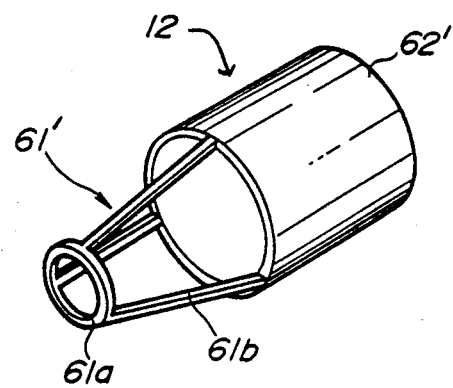
Figure 16C:
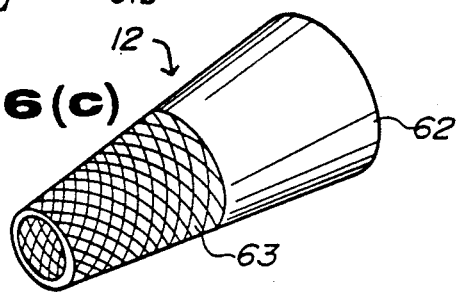

A second embodiment of the invention will now be described with reference to FIGS. 15(a) to 17. FIGS. 15(a) and 15(b) are a schematic perspective view and a schematic sectional view of a clinical thermometer (a mirror type) embodying the second embodiment, and FIGS. 16(a) to 16(c) are schematic perspective views of variations of the tip portion 12 of a probe of the clinical thermometer. In FIGS. 15(a) and 15(b) and 16(a) and 16(b), numerals 61 and 61' denote inserting portions formed in the shape of a tripod; numerals 62 and 62' respective denote frustoconical and cylindrical holding portions for the respective inserting portions 61 and 61' which holding portion is formed of a plastic material. In FIG. 16(c), numeral 63 denotes an inserting portion formed in the shape of a net forward of the holding portion 62.

In this embodiment the inserting portions in FIGS. 16(a) and 16(b) are formed using metallic rods or wires superior in heat conductivity to improve the heat radiation of the tip portion 12.

In FIGS. 16(a) and 16(b), the inserting portions 61 and 61' are formed by three metallic legs, with a tip end 61a thereof being formed in the shape of a ring of about a size permitting insertion into the human ear cavity. It is desirable that the tip end 61a be formed of a metal of high thermal conductivity such as, for example, copper or aluminum. In FIG. 16(a), the diameter of the tip end 61a is about 8 mm and legs 61b of the inserting portion 61 are fixed into the holding portion 62 formed of a plastic material. For example, in forming the holding portion 62 by injection molding of a plastic material, the legs 61b are fixed so that the respective rear ends are embedded in the front end of the holding portion 62. And the legs 61b of the inserting portion 61 are tapered at the same angle as the side part of the holding portion 62 so that the whole of the tip portion 12 is generally in a conical shape. In FIG. 16(b), although the diameter of the tip end 61a of the inserting portion 61' is also about 8 mm like that in FIG. 16(a), the holding portion 62' is formed in a cylindrical shape. Reduction of the diameter of the tip end 61a to about 6 mm permits the use as a clinical thermometer for children. In FIG. 16(c), in place of a three-leg structure, the inserting portion 63 is formed in the shape of a net using a metal of high thermal conductivity, e.g. aluminum, which is attached to the holding portion 62. Other structural points are the same as in the foregoing first embodiment and modifications.

Figure 17:
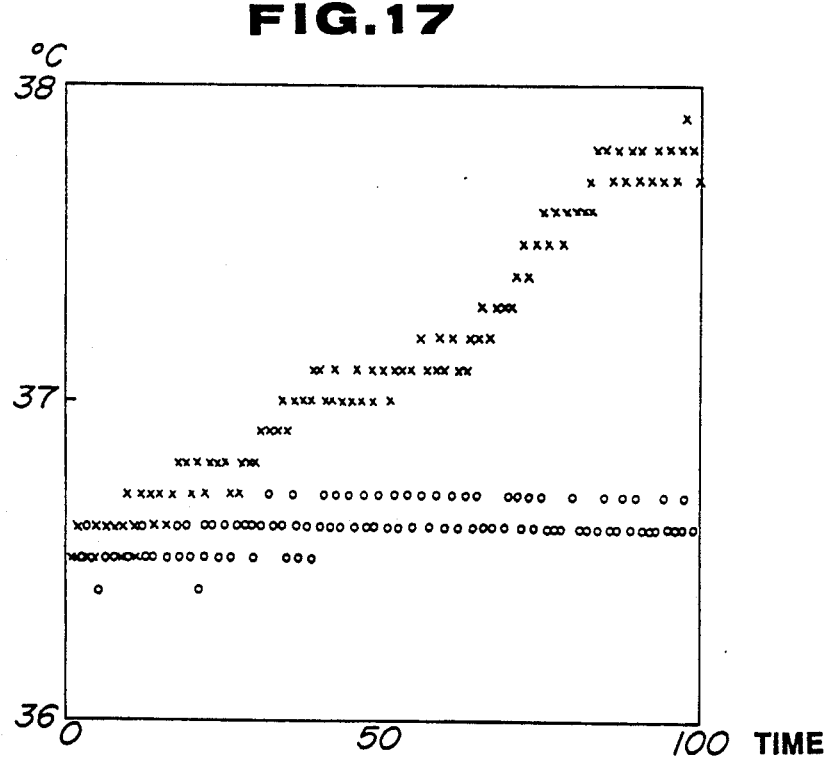
FIG. 17 is a plot of experimental data thereof.

FIG. 17 shows experimental data obtained by measuring the body temperature 100 times continuously for about 30 minutes using the clinical thermometer of the embodiment shown in FIG. 16(a) and like data obtained by making the measurement in the same manner using a clinical thermometer having a probe tip end formed wholly of a plastic material. In FIG. 17, the x-mark represents the data obtained using the clinical thermometer having a probe tip portion formed entirely of a plastic material, while the o-mark shows the data obtained using the clinical thermometer shown in FIG. 16(a). As shown in FIG. 17, with the clinical thermometer having a tip portion of a probe 10 formed entirely of a plastic material, the body temperature readings rise above 1° C., causing an error. On the other hand, with the clinical thermometer having a probe tip portion formed like FIG. 16(a), there scarcely occurs an error. Also with the clinical thermometers of the structures shown in FIGS. 16(a) and 16(b), there scarcely occurs an error.

According to this embodiment of the invention, as set forth above, the rise in temperature of the tip portion 12 can be prevented during temperature measurement to minimize the occurrence of measurement error by forming the tip portion 12 using metallic rods or wires of good heat conductivity. Other functions and effects are the same as in the first embodiment.

Figure 18:
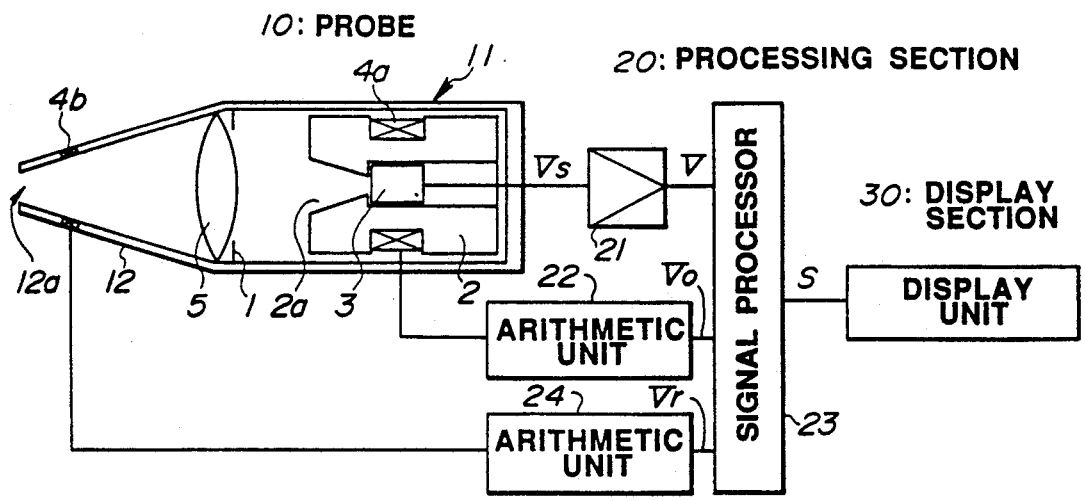
FIG. 18 is a view of a basic construction of a clinical thermometer according to a third embodiment of the invention.

A third embodiment of the invention will now be described with reference to FIGS. 18 to 22(b). FIG. 18 illustrates a basic construction of a clinical thermometer according to the third embodiment, in which a temperature measuring element 4b is also attached to a tip portion 12 to correct a temperature measurement error caused by a change in temperature of the tip portion 12 during temperature measurement.

In FIG. 18, numeral 4a denotes a temperature measuring element for measuring room temperature; numeral 4b denotes a temperature measuring element for measuring the temperature of the tip portion 12; and numeral 24 denotes an arithmetic unit for converting the output of the temperature measuring element 4b into voltage. At the tip portion 12 is disposed the temperature measuring element 4b to measure the temperature of the tip portion. Also in a support 2 is disposed the temperature measuring element 4a to measure the temperature of an infrared sensor 3 in accordance with the ambient temperature of the sensor. The temperature measuring elements 4a and 4b are each constituted by a resistance bulb, e.g. a thermistor, or a diode or the PN junction of a transistor.

Figure 20A:
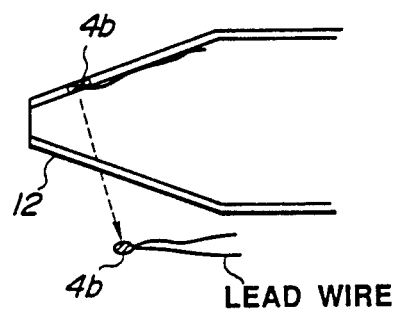
FIGS. 20(a)–20(b) are schematic views showing respective temperature measuring elements as mounted to the tip portion of the probe.
Figure 20C:
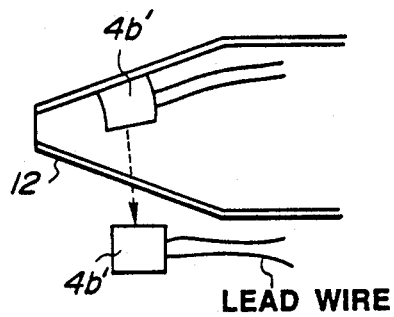
Figure 20B:
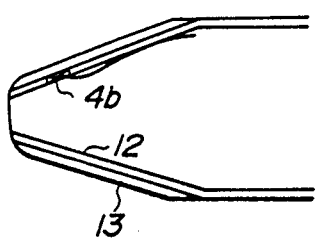
Figure 20D:
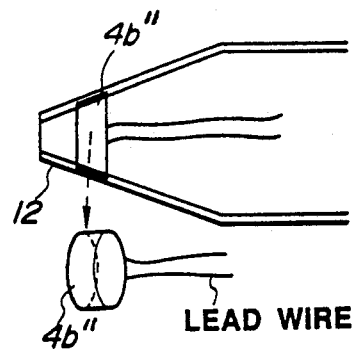

The temperature measuring element 4b may be embedded in the tip portion 12 as a one point measuring element of a small-sized round or square shape, as shown in FIG. 20(a), or it may be stuck on the inner surface of the tip portion as a thin film (e.g. 0.1 mm thick) element 4b' of a wide area, as shown in FIG. 20(c), or it may be in the shape of a ring 46 fitted inside the tip portion, as shown in FIG. 20(d). It is also effective to apply a cover 13 onto the tip portion 12, as shown in FIG. 20(b), to prevent the temperature measuring element 4b from measuring the circumferential surface temperature of a cavity, e.g. the ear cavity, and also prevent the rise in temperature of the tip portion 12 when inserted into the ear cavity.

A processing section 20 shown in FIG. 18 is provided with a signal amplifier 21 for amplifying the output Vs of the infrared sensor 3; an arithmetic unit 22 for converting the output (change in resistance) of the temperature measuring element (thermistor) 4a into voltage Vo; an arithmetic unit 24 for converting the output (change in resistance) of the temperature measuring element (thermistor) 4b into voltage Vr; and a signal processor 23 which receives the output V of the amplifier 21 and the outputs Vo, Vr of the arithmetic units 22, 24 and provides a body temperature signal S. The amplifier 21, arithmetic units 22, 24 and signal processor 23 may be constituted each individually, or integrally as shown in FIGS. 21 and 22. Other constructional points are the same as in the foregoing first embodiment.

Figure 19A:
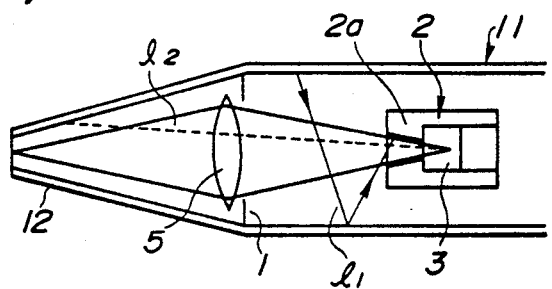
FIGS. 19(a) and 19(b) are explanatory views of intra-probe optical systems.
Figure 19B:
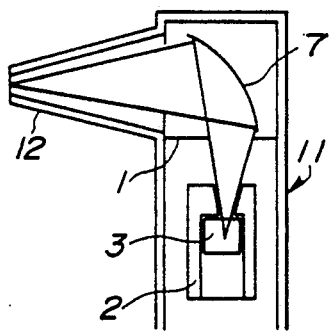

When the housing tip portion 12 is inserted into the ear cavity, its temperature rises and the dose of infrared radiation radiated from the same tip portion changes (increases), causing an error. The dotted line $l_2$ in FIG. 19(a) represents infrared radiation radiated from the inner surface of the housing tip portion 12 into the infrared sensor 3. This kind of phenomenon occurs in the body temperature measurement using infrared radiation, but scarcely causes a problem in the case where the object to be measured for temperature is high in temperature. However, a slight error (e.g. an error of 0.1° C. at a temperature rise of 2° C.) occurs in the case of a low temperature such as the body temperature. The output Vr of the arithmetic unit 23 corrects such error.

Using these outputs V, Vo and Vr, the signal processor 23 corrects the ambient temperature of the infrared sensor 3, outputs a correct body temperature signal S after temperature correction for the tip portion 12 inserted into the ear cavity, and causes a display unit in a display section 30 to display the body temperature. The signal S is an analog signal when the display unit is an analog type, or it is a digital signal when the display unit is a digital type.

The temperature correction for the tip portion 12 will now be explained. Once the design of the probe 10 is decided on the basis of an optical technique, the whole of the probe 10 is regarded as a measuring instrument, which is corrected using a black body furnace. It is also processed by a signal processor so as not to be influenced by room temperature. Therefore, as long as the temperature of the probe tip 12 and that of the probe body (the portion where the infrared sensor 3 is located) are equal, there will be no influence of the tip portion 12. When the tip portion is inserted into the ear cavity, the temperature measurement will be completed in several seconds, but where the temperature measurement is to be repeated, the temperature of the tip portion 12 will gradually become higher than room temperature, causing an increase in dose of the infrared ray which is radiated from the tip portion into the infrared sensor 3, so the temperature value displayed will be a little higher. The error generated is 0.1° C. when the difference between room temperature and the temperature of the tip portion 12 is 2° C., under the conditions of an opening 12a being 5~6 mm in diameter, the housing diameter at the junction with an infrared lens 5 being 13 mm, the probe tip length 25 mm, and the inner surface being rendered mirror surface-like by the vapor deposition of aluminum, using Delrin as the material of the tip portion 12, for example.

The electromotive force generated, Vs, of the infrared sensor (thermopile) 3 is proportional to $\alpha\,(T^4 - T_0^4)$ (T: temperature of the object measured, To: room temperature). The $\alpha$ is a correction coefficient which is determined by the components (optical elements: lens, mirror, shape, solid angle). Where the range of measurement is narrow, that is, in the vicinity of the body temperature (approx. 35°~40° C.), the error is very small even if calculation is made according to a linear approximation. In other words, the electromotive force generated, Vs, may be assumed to be proportional to $\beta\,(T - T_0)$ ($\beta$: a constant determined by the temperature measurement range, in which is included the influence of the components).

If the temperature measuring elements 4a and 4b are resistance bulbs such as thermistors, the change in resistance caused by the change of temperature can be expressed as $Ro = \overline{R}(1+\gamma t)$ wherein $\overline{R}$, $\gamma$ and $t$ represent a resistance value at 0° C., a temperature coefficient and a measured temperature (unit: °C.), respectively. In the case of a platinum resistance bulb, JIS applies.

Since the amplified voltage V of the output Vs of the thermopile 3 is an output proportional to the difference between the internal temperature T of the ear cavity and room temperature To, $[V = \beta(T - T_0)]$, the difference in temperature, $\Delta T\,(= T - T_0)$ is determined by $V/\beta$. Since the room temperature To is determined from the output Vo of the temperature measuring element 4a, the temperature T of the object measured is calculated from $\Delta T + T_0$.

The output Vr of the temperature measuring element 4b includes a detected value of the temperature (Tr) of the tip portion 12. No correction is needed when the measured temperature $Tr = T_0$, but correction is required when $Tr > T_0$ or $Tr < T_0$. When $Tr > T_0$, the dose of the infrared radiation incident on the thermopile 3 increases, while it decreases when $Tr < T_0$. Therefore, when $Tr > T_0$, the calculated temperature T is rather high, while when $Tr < T_0$, it is rather low. The amount of correction is determined by the shape of the probe tip 12 and optical elements. In the characteristics of the foregoing lens construction, the amount of correction is 0.1° C. at a temperature difference $|Tr - T_0|$ of 2° C. The signal processor 23 processes the aforementioned contents (digital processing or analog processing, or a combination of both) to determine a true temperature T of the object measured and displays it on the display unit 30.

The processing section 20 may be constructed so that the infrared sensor 3 and the temperature measuring elements 4a, 4b are incorporated wholly or partially in the circuit of the processing section as shown in FIGS. 21(a)-21(e), 22(a) and 22(b) to obtain a temperature-compensated output S.

Figure 21A:
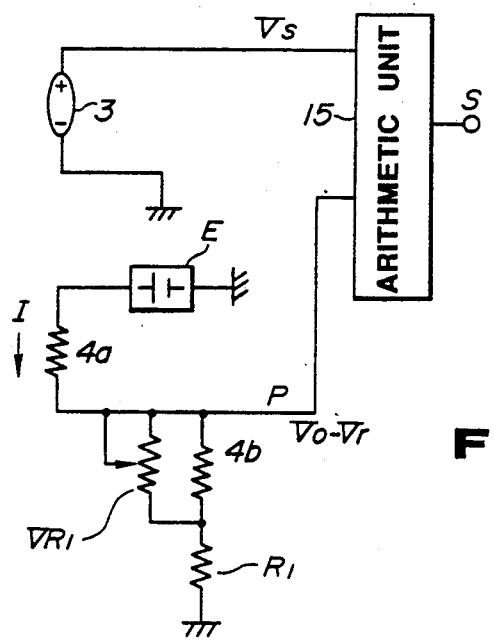
FIGS. 21(a)-21(e), 22(a) and 22(b) are circuit diagrams showing examples of constructions of a processing section.

In FIG. 21(a), the temperature measuring elements 4a and 4b are connected in series and an electric current I flows from a constant voltage source E to develop a voltage Vp proportional to the correction voltage Vo−Vr at a series junction P of those temperature measuring elements, which is then subjected to processing in an arithmetic unit 15 together with the output Vs of the infrared sensor 3 to obtain $S=Vs+Vo-Vr$ (voltage coefficients are omitted here and also in the following). The reference characters R and VR represent a resistor and a variable resistor, respectively, (the subscripts $_1$, $_2$, . . . are for distinguishing among them and may be omitted herein). A variable resistor $VR_1$ is for adjustment of the output voltage Vr of the temperature measuring element 4b.

Figure 21B:
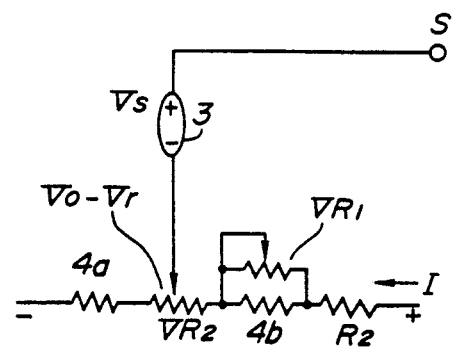

In FIG. 21(b), the temperature measuring element 4a, a variable resistor $VR_2$, the temperature measuring element 4b and a resistor $R_2$ are series-connected in this order and an electric current I flows from a constant voltage source, with the infrared sensor 3 being connected to a slider of the variable resistor $VR_2$. At this slider there is obtained $Vo-Vr$, so the output S at the other end of the infrared sensor 3 becomes $Vs+Vo-Vr$.

Figure 21C:
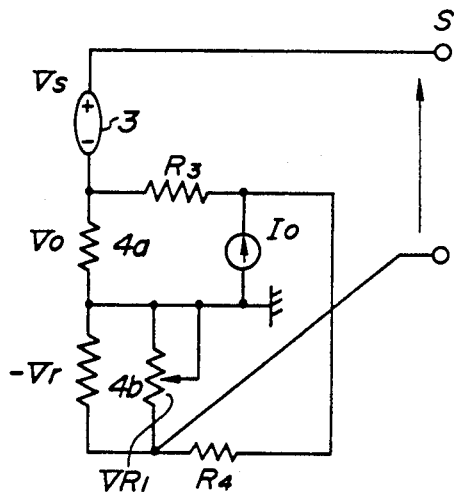

In FIG. 21(c), an electric current flows through the temperature measuring element 4a from a constant current source Io to develop Vo, and an electric current also flows through the temperature measuring element 4b from the constant current source to develop Vr, with the infrared sensor 3 being connected in series with the temperature measuring element 4a, to obtain $S=Vs+Vo-Vr$ at the output end.

Figure 21D:
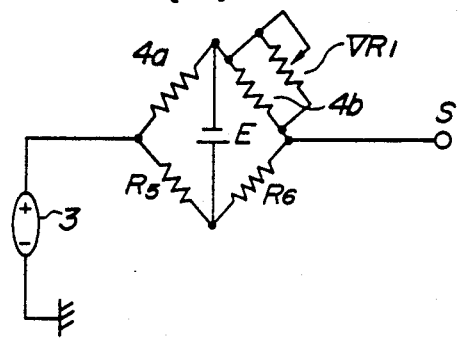

In FIG. 21(d), the temperature measuring elements 4a and 4b are bridged together with resistors $R_5$ and $R_6$ and an electric current flows from a power source E to obtain $Vo-Vr$, which is added to the output of the infrared sensor 3 to obtain $S=Vs+Vo-Vr$.

Figure 21E:
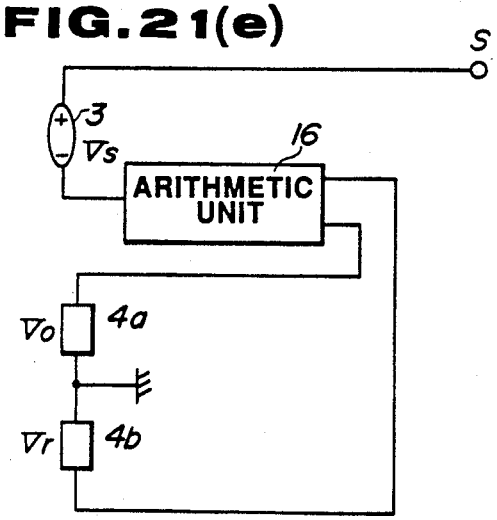

In FIG. 21(e), an electric current flows through the temperature measuring elements 4a and 4b to develop Vo and Vr, which are received by an arithmetic unit 16. The arithmetic unit 16 in turn generates $Vo-Vr$ and adds it to the output Vs of the infrared sensor 3 to obtain $S=Vs+Vo-Vr$.

Figure 22A:
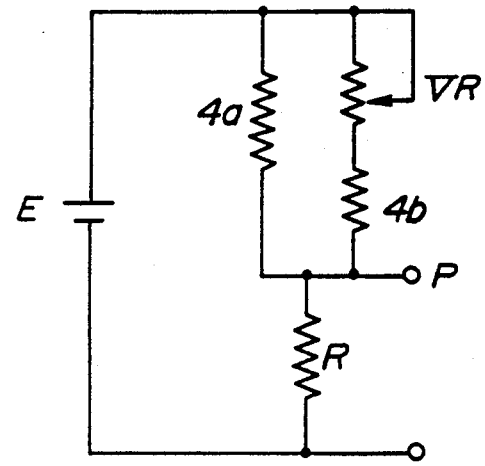
Figure 22B:
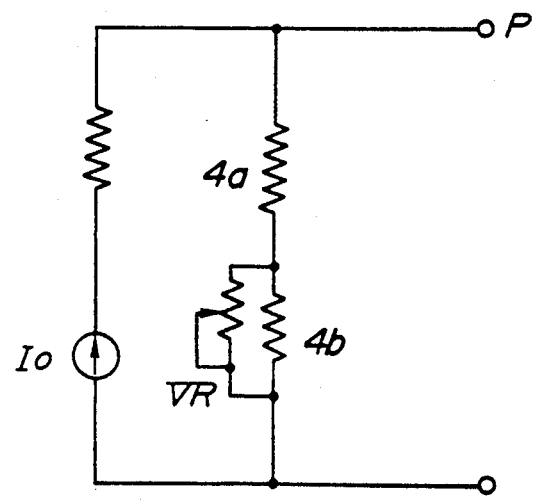

FIGS. 22(a) and 22(b) show examples in which a temperature measuring element having a positive temperature coefficient such as a platinum resistance bulb is used as the temperature measuring element 4a for the correction of room temperature, and a temperature measuring element having a negative temperature coefficient such as an ordinary thermistor is used as the temperature measuring element 4b for the correction of the temperature of the probe tip portion. In FIGS. 22(a) and 22(b) there are used a constant voltage source E and a constant current source Io, respectively, in both of which there is obtained $Vo-Vr$ at the output end P, so this may be added to the output of the infrared sensor.

Since this clinical thermometer is inserted into a cavity such as the ear or oral cavity for the measurement of its temperature, it is necessary to keep it clean. The use of such a cover as shown in FIG. 20(b) is hygienically effective because it can be made disposable or removed for washing.

It is effective to have the tip end 12a opened in point of conducting infrared ray without loss into the housing 11, but the open tip end is disadvantageous in that dust will get in the interior of the housing 11. To prevent this, it may be effective to cover the tip end 12a with an infrared ray transmitting window.

FIG. 23 is a schematic perspective view showing a first application example of the third embodiment, and FIGS. 24(a) and 24(b) show related plot and print examples, respectively. In the construction of this application example, a memory module and a printer are combined with the clinical thermometer of this embodiment of the third invention to thereby permit storage and recording of data. In FIG. 23, the numerals 71, 72 and 73 denote a measuring portion body, a memory module and a printer, respectively. To the measuring portion body 71 is attached a hold switch 71a and a symbol M, showing that the present display is memory, is indicated on the display section 30. On the memory module 72 are mounted a memory address display 72a, a memory address count-up/count-down button 72b and a display change-over button 72c for the change-over of display between measured value and memory. Mounted on the printer 73 are a single data printing button 73a, a plotting button 73b and a printing button 73c for all data. Numeral 80 denotes printing paper.

When a single measurement is to be taken using this application example, the memory module 72 and the printer 73 are separated from the measuring portion body 71 and only the latter is used. When a multitude of measurements are to be taken, the memory module 72 is coupled to the measuring portion body 71 to store data. The memory module 72 may contain calendar and clock functions, whereby the month, date and time can be stored automatically. When measured values are to be exhibited, the printer 73 is coupled to the memory module 72 to print out the values. Upon depression of the plotting button 73b there is obtained the output shown in FIG. 24(a), while when the all-data printing button 73c is pushed, there is obtained the output shown in FIG. 24(b).

This application example is convenient when a multitude of measurement data is required; for example, it is particularly effective when used as a clinical thermometer for ladies or when used for measuring the temperature distribution of the surface of a human body.

Figure 25:
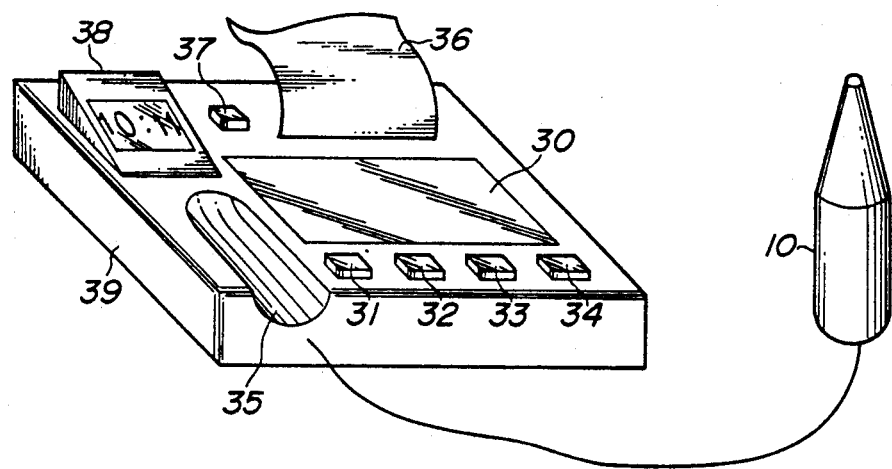
FIG. 25 is a schematic perspective view of a second application example of the third embodiment of the invention.

FIG. 25 is a schematic perspective view showing a second application example of the third embodiment of the invention, in which application example the clinical thermometer embodying the third embodiment is formed as a desk-top type for domestic use. The probe 10 is received in a groove 35 of a body 39 and the processing section 20 is mounted within the body 39. The display section 30 may be an analog or digital type or a caricature type which displays the body temperature by classification such as normal, feverish, and having a high fever, using caricatures respectively. In the latter case, as the display unit it is suitable to use a liquid crystal display unit. In the body 39 there are also provided a memory and a printing mechanism though not shown. Numeral 36 denotes printing paper; numeral 37 denotes a paper feed button; numerals 31 to 34 also represent push-buttons, of which the push-button 31 is for the input of temperature-measured month, date and time, the button 32 is for storing the results of temperature measurement into the memory, the button 33 is for instructing display, and the button 34 is for instructing printing. Numeral 38 denotes a calendar, which is driven by a clock mechanism incorporated in the body 39 to display the month and day.

Figure 26A:
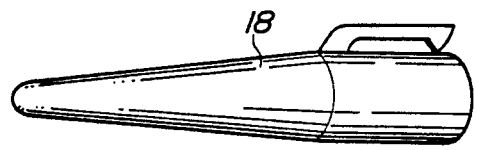
FIGS. 26(a), 26(b) and 26(c) are schematic perspective views of three variations of a third application example of the third embodiment of the invention.
Figure 26B:
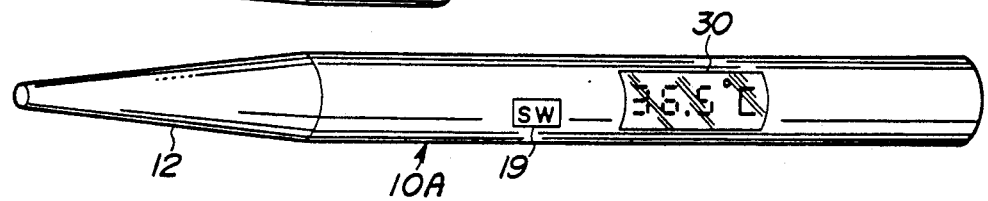
Figure 26C:
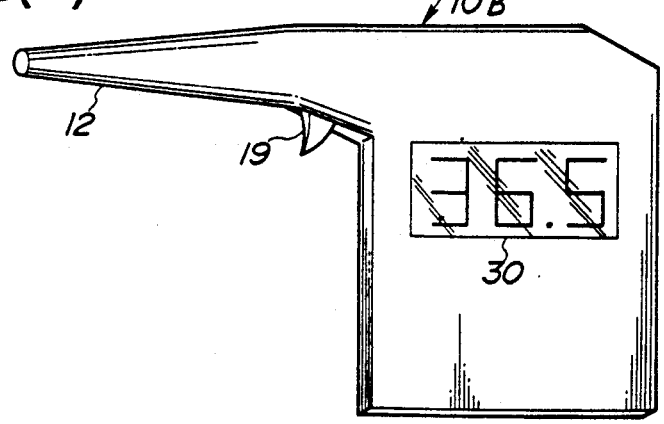

FIGS. 26(a) to 26(c) are schematic perspective views showing a third application example of the third embodiment of the invention, of which FIGS. 26(a) and 26(b) illustrate clinical thermometers each formed in the shape of a pencil. There is shown a probe 10A integral with the body portion (processing and display sections 20, 30). Numeral 18 denotes a cap for covering the probe tip portion. When the clinical thermometer is not in use, the cap 18 is fitted over the probe tip portion to protect the tip opening (12a), etc. It is hygienically suitable to put inside the cap 18 a porous elastic material impregnated with an antiseptic liquid such as alcohol. Numeral 19 denotes a switch for instructing the start of measurement (application of power). Just after the application of power, measurement is made in the direction in which the probe 10 is directed, that is, an ambient temperature lower than the body temperature is measured, so it is desirable to provide means for preventing a display from appearing on the display section unless the result of a temperature measurement is above 35° C. for example (under the use of a processor, such means corresponds to a routine which judges whether the temperature measurement result is above 35° C. or not).

At the probe tip portion there may be provided a pressure sensor to make display upon response thereof to pressure when the tip end is inserted into the ear cavity. Preferably, there is provided a holding means for holding the result of temperature measurement to let the display section 30 keep on displaying the maximum temperature until reset, so that it is possible to know the body temperature by seeing the display section 30 after pulling the probe tip portion from the ear cavity. FIG. 26(c) illustrates a pistol-shaped clinical thermometer 10B.

FIGS. 27(a) to 27(e) are schematic perspective views showing other application examples of the embodiment of the third invention. FIG. 27(a) shows a clinical thermometer of a shape similar to that of a compact for ladies with a probe 10C; FIG. 27(b) shows a clinical thermometer with probe 10D integral with a lipstick 43; FIG. 27(c) shows a clinical thermometer having a cylindrical probe 10E which can be separated from the body portion at the part of a socket 44; FIG. 27(d) shows a clinical thermometer for children having a probe 10F in the shape of an animal nose; and FIG. 27(e) shows a clinical thermometer for use in medical institution, with a probe 10G and with a long-term monitor/diagnostic memory as well as recorder/plotter being provided in a body portion 39. Although in the above application examples shown in FIGS. 23 to 27(e) the respective clinical thermometers are each provided at the tip portion thereof with the temperature measuring element 4b, this does not mean any limitation. The tip portion may be heat-insulated as in the examples of the first embodiment, or the tip portion of the housing may be formed using a metallic net of good heat radiation as in the second embodiment of the invention.

According to the third embodiment as set forth above in detail, there can be provided a highly accurate, relatively inexpensive, clinical thermometer which has been subjected to room temperature correction and temperature correction for the probe tip portion and which can measure the body temperature quickly and easily.

The above first and third embodiments are not limited to the examples, variations and modifications described above. For example, they may be used for measuring the temperature of not only the human body but also animals.

Thus, the clinical thermometer of the present invention is useful as a clinical thermometer for measuring the human body temperature. Particularly, it is suitable for the case where it is required to measure the body temperature correctly in a short time, for example, when infants, sick persons, or a large number of persons, are to be measured for body temperature.

What is claimed is:

1. A clinical thermometer, comprising:
a housing having a tip portion, the top portion having an opening therein;
an infrared sensor mounted in said housing;
an optical system in said housing having one of a lens and a concave mirror for focusing on said infrared sensor infrared radiation incident on said opening from a body whose temperature is to be measured, said infrared sensor having means for measuring the amount infrared radiation incident thereon and for producing a first signal indicative of the measured amount of infrared radiation, the first signal containing an error which corresponds to the ambient temperature of the infrared sensor;
a temperature measuring means for measuring, and producing a second signal indicative of, the ambient temperature of said infrared sensor, said temperature measuring means being unexposed to any of the infrared radiation focused by said optical system;
means, including a heat insulator means attached to said tip portion, for heat insulating said tip portion so as to reduce an entry of heat into the housing through the tip portion and thereby reduce a temperature variation of the infrared sensor;
a processing section having means, responsive to said first and second signals, for correcting the error in the first signal and producing a body temperature signal indicative of the temperature of the body based on the corrected first signal; and
a display unit which receives the body temperature signal and displays the body temperature visually.

2. A clinical thermometer according to claim 1, wherein said heat insulator is a thin-walled cap, having front and rear ends, fitted on said tip portion, said cap having lugs at one or both of said front and rear ends and being in contact with an outer peripheral surface of said tip portion through said lugs to form an air gap between an inner surface of said cap and said outer peripheral surface of said tip portion.

3. A clinical thermometer according to claim 1, wherein said heat insulator is a cap formed of a thick-walled heat insulating material and fitted on said tip portion.

4. A clinical thermometer according to claim 1, wherein said temperature measuring element is bonded to a bottom of said infrared sensor opposite a surface of said infrared sensor on which the infrared radiation is focused, and at least the temperature measuring means is embedded in a highly heat-conductive member so as to maintain the temperatures of said temperature measuring means and said infrared sensor the same.

5. A clinical thermometer according to claim 4, wherein said temperature measuring means, said infrared sensor and said highly heat-conductive member are enclosed in a heat insulating material.

6. A clinical thermometer according to claim 1, wherein said housing has a ventilating means for ventilating heat from said housing so as to reduce a temperature variation of said infrared sensor, said ventilating means being formed adjacent to said infrared sensor.

7. A clinical thermometer, comprising:
a housing having a tip portion, the tip portion having an opening therein;
an infrared sensor mounted in said housing, the tip portion being formed of one of heat conductive linear members, heat conductive rod-like members and a metallic net-like member, whereby substantial heat dissipation from said tip portion is obtained so as to reduce an entry of heat into the housing through the tip portion and thereby reduce a temperature variation of the infrared sensor;

an optical system in said housing having one of a lens and a concave mirror for focusing on said infrared sensor infrared radiation incident on said opening from a body whose temperature is to be measured, said infrared sensor having means for measuring the amount infrared radiation incident thereon and for producing a first signal indicative of the measured amount of infrared radiation, the first signal containing an error which corresponds to the ambient temperature of the infrared sensor;

a temperature measuring means for measuring, and producing a second signal indicative of, the ambient temperature of said infrared sensor, said temperature measuring means being unexposed to any of the infrared radiation focused by said optical system;

a processing section having means, responsive to said first and second signals, for correcting the error in the first signal and producing a body temperature signal indicative of the temperature of the body based on the corrected first signal; and a display unit which receives the body temperature signal and displays the body temperature visually.

8. A clinical thermometer according to claim 7, wherein said temperature measuring means is bonded to a bottom of said infrared sensor opposite a surface of said infrared sensor on which the infrared radiation is focused, and at least the temperature measuring means is embedded in a highly heat-conductive member so as to maintain the temperatures of said temperature measuring means and said infrared sensor the same.

9. A clinical thermometer according to claim 8, wherein said temperature measuring means, said infrared sensor and said highly heat-conductive member are enclosed in a heat insulating material.

10. A clinical thermometer according to claim 7, wherein said housing has a ventilating means for ventilating heat from said housing so as to reduce a temperature variation of said infrared sensor, said ventilating means being formed adjacent to said infrared sensor.

11. A clinical thermometer, comprising:

a housing having a tip portion, the top portion having an opening therein;

an infrared sensor mounted in said housing;

an optical system in said housing having one of a lens and a concave mirror for focusing on said infrared sensor infrared radiation incident on said opening from a body whose temperature is to be measured, said infrared sensor having means for measuring the amount infrared radiation incident thereon and for producing a first signal indicative of the measured amount of infrared radiation, the first signal containing errors which respectively correspond to the ambient temperature of the infrared sensor and the ambient temperature of the tip portion;

a first temperature measuring means for measuring, and producing a second signal indication of, the ambient temperature of said infrared sensor, said first temperature measuring means being unexposed to any of the infrared radiation focused by said optical system;

a second temperature measuring means for measuring and producing a third signal indicative of the ambient temperature of said tip portion;

a processing section having means, responsive to said first, second and third signals, for correcting the errors in the first signal and producing a body temperature signal indicative of the temperature of the body based on the corrected first signal; and a display unit which receives the body temperature signal and displays the body temperature visually.

12. A clinical thermometer according to claim 11, wherein said first temperature measuring means is bonded to a bottom of said infrared sensor opposite a surface of said infrared sensor on which the infrared radiation is focused, and at least said temperature first measuring means is embedded in a highly heat-conductive member so as to maintain the temperatures of said temperature measuring means and said infrared sensor the same.

13. A clinical thermometer according to claim 12, wherein said first temperature measuring means, said infrared sensor and said highly heat-conductive member are enclosed in a heat insulating material.

14. A clinical thermometer according to claim 11, wherein said housing has a ventilating means for ventilating heat from said housing so as to reduce a temperature variation of said infrared sensor, said ventilating means being formed adjacent to said infrared sensor.

* * * * *